(12) United States Patent
Seo et al.

(10) Patent No.: US 10,560,925 B2
(45) Date of Patent: Feb. 11, 2020

(54) METHOD AND APPARATUS FOR TRANSMITTING UPLINK CONTROL INFORMATION IN WIRELESS COMMUNICATION SYSTEM

(71) Applicant: LG ELECTRONICS INC., Seoul (KR)

(72) Inventors: Dong Youn Seo, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/835,674

(22) Filed: Dec. 8, 2017

(65) Prior Publication Data

US 2018/0103467 A1      Apr. 12, 2018

Related U.S. Application Data

(63) Continuation of application No. 14/346,499, filed as application No. PCT/KR2012/007667 on Sep. 24, 2012, now Pat. No. 9,877,309.

(Continued)

(51) Int. Cl.
*H04W 72/04* (2009.01)
*H04L 1/00* (2006.01)
(Continued)

(52) U.S. Cl.
CPC ......... *H04W 72/0413* (2013.01); *H04L 1/007* (2013.01); *H04L 1/0026* (2013.01);
(Continued)

(58) Field of Classification Search
CPC .... H04W 72/04; H04W 72/0413; H04L 1/00; H04L 1/0026; H04L 1/0041;
(Continued)

(56) References Cited

U.S. PATENT DOCUMENTS 6,222,467 B1    4/2001  Moon ............... H04N 19/61
                                                341/106
6,560,292 B1 *  5/2003  Lundby ............. H04B 1/707
                                                375/259

(Continued)

FOREIGN PATENT DOCUMENTS

CH    101702632 A    5/2010
CN    101800620 A    8/2010
(Continued)

OTHER PUBLICATIONS

ZTE: "Remaining Issues of UL Channel Combinations for Rel-10", R1-110808, XP050490596, 3GPP TSG RAN WG1 Meeting #64, Taipei, CN, Feb. 21-25, 2011.

(Continued)

*Primary Examiner* — Kashif Siddiqui
(74) *Attorney, Agent, or Firm* — Dentons US LLP

(57) ABSTRACT

Provided are a method and an apparatus for transmitting uplink control information (UCI), which is carried out by a terminal in a wireless communication system. If the number of information bits of the UCI falls inside a specific range when different types of UCI are transmitted through the same PUCCH format, a bit sequence of each of the UCI are channel-coded by aligning/interleaving, wherein the aligning/interleaving is carried out so that the UCI having high importance are channel-coded so as to have better decoding performance.

9 Claims, 26 Drawing Sheets

Related U.S. Application Data

(60) Provisional application No. 61/538,148, filed on Sep. 23, 2011, provisional application No. 61/545,193, filed on Oct. 9, 2011, provisional application No. 61/554,964, filed on Nov. 2, 2011, provisional application No. 61/556,279, filed on Nov. 6, 2011, provisional application No. 61/588,169, filed on Jan. 18, 2012, provisional application No. 61/594,389, filed on Feb. 3, 2012, provisional application No. 61/611,561, filed on Mar. 15, 2012, provisional application No. 61/645,059, filed on May 10, 2012, provisional application No. 61/650,990, filed on May 23, 2012, provisional application No. 61/678,618, filed on Aug. 1, 2012.

(51) Int. Cl.
*H04L 1/16* (2006.01)
*H04L 5/00* (2006.01)
*H04L 1/18* (2006.01)

(52) U.S. Cl.
CPC .......... *H04L 1/0041* (2013.01); *H04L 1/0071* (2013.01); *H04L 1/0072* (2013.01); *H04L 1/1671* (2013.01); *H04L 1/1685* (2013.01); *H04L 1/1692* (2013.01); *H04L 1/1896* (2013.01); *H04L 5/0037* (2013.01); *H04L 5/0055* (2013.01); *H04L 5/0057* (2013.01); *H04L 1/0057* (2013.01); *H04L 5/001* (2013.01)

(58) Field of Classification Search
CPC ..... H04L 1/0057; H04L 1/007; H04L 1/0071; H04L 1/0072; H04L 1/16; H04L 1/1671; H04L 1/1685; H04L 1/1692; H04L 1/18; H04L 1/1896; H04L 5/00; H04L 5/001; H04L 5/0037; H04L 5/0055; H04L 5/0057

See application file for complete search history.

(56) References Cited

U.S. PATENT DOCUMENTS

| | | | | |
|---|---|---|---|---|
| 8,670,379 | B2 | 3/2014 | Yamada | H04L 1/0073 370/328 |
| 8,705,339 | B2 | 4/2014 | Takaoka | H04B 1/713 370/210 |
| 8,842,609 | B2 | 9/2014 | Lee et al. | |
| 8,989,169 | B2 | 3/2015 | Kwon | H04L 1/0027 370/310 |
| 9,008,199 | B2* | 4/2015 | van Nee | H03M 13/2757 375/260 |
| 9,060,360 | B2 | 6/2015 | Yang et al. | |
| 9,144,063 | B2 | 9/2015 | Papasakellariou | H04W 72/0413 |
| 9,294,230 | B2* | 3/2016 | Han | H04L 1/1657 |
| 9,363,820 | B2 | 6/2016 | Wang | |
| 2003/0081690 | A1 | 5/2003 | Kim | H04L 1/0003 375/264 |
| 2003/0134655 | A1* | 7/2003 | Chen | H04L 12/1877 455/522 |
| 2005/0094584 | A1 | 5/2005 | Kluge | H04B 1/40 370/310 |
| 2005/0152266 | A1* | 7/2005 | Hwang | H04L 1/0071 370/210 |
| 2006/0176803 | A1 | 8/2006 | Oh | H04L 1/0058 370/210 |
| 2006/0227892 | A1* | 10/2006 | Ouyang | H04B 7/04 375/267 |
| 2009/0116570 | A1 | 5/2009 | Bala | H04L 1/0026 375/260 |
| 2009/0217139 | A1* | 8/2009 | Roh | H03M 13/03 714/783 |
| 2009/0245284 | A1 | 10/2009 | Xu et al. | |
| 2010/0278109 | A1 | 11/2010 | Papasakellariou | H04L 5/0037 370/328 |
| 2011/0200018 | A1* | 8/2011 | Tazeh Mahalleh | H04L 5/001 370/336 |
| 2011/0205981 | A1 | 8/2011 | Koo | H04L 1/1671 370/329 |
| 2011/0243066 | A1 | 10/2011 | Nayeb Nazar | H04L 1/007 370/328 |
| 2011/0243600 | A1 | 10/2011 | Gonzales Perez et al. | |
| 2011/0249578 | A1 | 10/2011 | Nayeb Nazar | H04L 1/0027 370/252 |
| 2011/0269490 | A1 | 11/2011 | Earnshaw et al. | |
| 2011/0319068 | A1 | 12/2011 | Kim | H04L 1/1671 455/422.1 |
| 2012/0033587 | A1 | 2/2012 | Papasakellariou | H04J 13/00 370/277 |
| 2012/0033752 | A1* | 2/2012 | Yoshii | H03M 13/258 375/260 |
| 2012/0051245 | A1* | 3/2012 | Nam | H04L 1/1671 370/252 |
| 2012/0069793 | A1 | 3/2012 | Chung | H04B 7/15542 370/315 |
| 2012/0106408 | A1* | 5/2012 | Papasakellariou | H04L 1/1614 370/280 |
| 2012/0113831 | A1 | 5/2012 | Pelletier et al. | |
| 2012/0113861 | A1* | 5/2012 | Chun | H04L 1/0025 370/252 |
| 2012/0134306 | A1 | 5/2012 | Cheng | H04L 1/0042 370/281 |
| 2012/0201207 | A1* | 8/2012 | Liu | H04W 24/10 370/329 |
| 2012/0230268 | A1 | 9/2012 | Marinier | H04L 5/0053 370/329 |
| 2012/0243497 | A1 | 9/2012 | Chung | H04L 5/0055 370/329 |
| 2012/0300741 | A1 | 11/2012 | Han et al. | |
| 2013/0022007 | A1 | 1/2013 | Berggren | H04L 5/001 370/329 |
| 2013/0034073 | A1 | 2/2013 | Aiba | H04L 1/0026 370/329 |
| 2013/0077596 | A1 | 3/2013 | Liang | H04L 1/0031 370/329 |
| 2013/0083741 | A1 | 4/2013 | Larsson et al. | |
| 2013/0114472 | A1 | 5/2013 | Tamaki | H04L 5/001 370/280 |
| 2013/0201841 | A1 | 8/2013 | Zhang | H04L 1/1607 370/252 |
| 2014/0112284 | A1 | 4/2014 | Mansour | H04L 1/0027 370/329 |

FOREIGN PATENT DOCUMENTS

| | | |
|---|---|---|
| CN | 101801025 A | 8/2010 |
| CN | 101883391 A | 11/2010 |
| CN | 102088343 A | 6/2011 |
| CN | 102098086 A | 6/2011 |
| CN | 102136896 A | 7/2011 |
| JP | 2014501067 A | 1/2014 |
| KR | 10-2010-0126857 A | 4/2009 |
| WO | 2008085000 A1 | 7/2008 |
| WO | 2011014034 A2 | 2/2011 |
| WO | 2011019795 A1 | 2/2011 |
| WO | 2011096718 A2 | 8/2011 |
| WO | 2012060647 A2 | 5/2012 |

OTHER PUBLICATIONS

ZTE: "Multiplexing of periodic CSI and ACK/NACK on PUCCH", 3GPP TSG RAN WG1 Meeting #63bis, R1-110164, Jan. 17-21, 2011.

Sharp: "Ordering of HARQ-ACK bits for RM coding", 3GPP TSG RAN WG1 Meeting #64, R1-110759, Feb. 21-25, 2011.

(56) References Cited

OTHER PUBLICATIONS

CATT: "Combination of UCI transmission in Rel-10", 3GPP TSG RAN WG1 Meeting #62bis, R1-105157, Oct. 11-15, 2010.
LG Electronics: "Further Details on PUCCH Format 3", 3GPP TSG RAN WG1 #63, R1-106100, Nov. 15-19, 2010.
Research in Motion: "Large Payload ACK/NACK Bit Mapping for TDD", 3GPP TSG RAN WG1 Meeting #63, R1-106319, Nov. 15-19, 2010.
InterDigital Communications, LLC: "Multiplexing of A/N and Periodic CSI on PUCCH", 3GPP TSG RAN WG1 Meeting #64, R1-110852, Feb. 21-25, 2011.
Huawei, HiSilicon, Research in Motion, CMCC, CATR, Samsung, CHTTL, New Postcom, MediaTek Inc.: "Proposal on ordering and segmentation of HARQ-ACK bits", 3GPP TSG RAN WG1 meeting #64, R1-110901, Feb. 21-25, 02011.
Sharp, "Ordering of HARQ-ACK bits for RM coding", 3GPP TSG RAN WG1 Meeting #64, R1-110759, Taipei, Taiwan, Feb. 21-25, 2011. See section 2.
ZTE, "Multiplexing of periodic CSI and ACK/NACK on PUCCH", 3GPP TSG RAN WGl Meeting #63bis, R1-110164, Dublin, Ireland, Jan. 17-21, 2011. See section 2, section 3.
ZTE, "Large ACK/NACK payload in support of CA in TDD", 3GPP TSG RAN WG1 Meeting #62bis, R1-105714, Xi'an, China, Oct. 11-15, 2010. See the entire document.
ETSI TS 36 213 v10.1.0, "$3^{rd}$ Generation Partnership Project; Technical Specification Group Radio Access Netwrok; Evolved Universal Terrestial Radio Access (E-UTRA) Physical Layer Procedures", Release 10, Mar. 2011.
"Large ACK/NACK payload in support of CA in TDD", 3GPP TSG RAN WG1 Meeting #62bis, ZTE Corporation, Oct. 2010.
Panasonic, "Explicit Release and its Acknowledgment for Semi-Persistent Scheduling", 3GPP TSG-RAN WG1 55bis, Jan. 12-16, 2009, R1-090247.
Nokia Siemens Networks, Nokia, "Remaining details related to PUCCH Format 3", 3GPP TSG RAN WG1 Meeting #62bis, Oct. 11-15, 2010, R1-105519.
Samsung, "HARQ-ACK Resource Indication in PUCCH for DL CA", 3GPP TSG RAN WG1 #62bis, Oct. 11-15, 2010, R1-105359.
Continuation of U.S. Pat. No. 9,877,309.

\* cited by examiner

METHOD AND APPARATUS FOR TRANSMITTING UPLINK CONTROL INFORMATION IN WIRELESS COMMUNICATION SYSTEM

This application is a Continuation of U.S. patent application Ser. No. 14/346,499, filed on Mar. 21, 2014, which is a 35 USC § 371 National Stage entry of International Application No. PCT/KR2012/007667, filed on Sep. 24, 2012, which claims priority to U.S. Provisional Application No. 61/538,148, filed on Sep. 23, 2011, 61/545,193, filed on Oct. 9, 2011, 61/554,964, filed on Nov. 2, 2011, 61/556,279, filed on Nov. 6, 2011, 61/588,169, filed on Jan. 18, 2012, 61/594,389, filed on Feb. 3, 2012, 61/611,561, filed on Mar. 15, 2012, 61/645,059, filed on May 10, 2012, 61/650,990, filed on May 23, 2012, and 61/678,618, filed on Aug. 1, 2012, all of which are hereby incorporated by reference in their entirety.

BACKGROUND OF THE INVENTION

Field of the Invention

The present invention relates to wireless communications, and more particularly, to a method and apparatus for transmitting uplink control information in a wireless communication system.

Related Art

In order to maximize efficiency of limited radio resources, an effective transmission and reception scheme and methods of utilization thereof have been proposed in a broadband wireless communication system. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading. As a result, complexity is decreased in a receiving end and an interval of a transmitted symbol is increased, thereby minimizing the ISI.

In a system using the OFDM as a modulation scheme, orthogonal frequency division multiple access (OFDMA) is a multiple access scheme in which multiple access is achieved by independently providing a part of available subcarrier to each user. In the OFDMA, frequency resources (i.e., subcarriers) are provided to respective users, and the respective frequency resources do not overlap with one another in general since they are independently provided to the multiple users. Consequently, the frequency resources are allocated to the respective users in a mutually exclusive manner. In an OFDMA system, frequency diversity for the multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

A multiple input multiple output (MIMO) technique uses multiple transmit antennas and multiple receive antennas to improve data transmission/reception efficiency. Exemplary methods for implementing diversity in a MIMO system include space frequency block code (SFBC), space time block code (STBC), cyclic delay diversity (CDD), frequency switched transmit diversity (FSTD), time switched transmit diversity (TSTD), precoding vector switching (PVS), spatial multiplexing (SM), etc. A MIMO channel matrix depending on the number of receive antennas and the number of transmit antennas can be decomposed into a plurality of independent channels. Each independent channel is referred to as a layer or a stream. The number of layers is referred to as a rank.

Uplink control information (UCI) can be transmitted through a physical uplink control channel (PUCCH). The UCI can include various types of information such as a scheduling request (SR), an acknowledgement/non-acknowledgement (ACK/NACK) signal for hybrid automatic repeat request (HARD), a channel quality indicator (CQI), a precoding matrix indicator (PMI), a rank indicator (RI), etc. The PUCCH carries various types of control information according to a format.

A carrier aggregation system has recently drawn attention. The carrier aggregation system implies a system that configures a broadband by aggregating one or more carriers having a bandwidth smaller than that of a target broadband when the wireless communication system intends to support the broadband.

There is a need for a method for effectively and reliably transmitting various types of UCI in the carrier aggregation system.

SUMMARY OF THE INVENTION

The present invention proposes a method and apparatus for transmitting uplink control information in a wireless communication system.

According to an aspect of the present invention, a method of transmitting uplink control information (UCI), performed by a terminal in a wireless communication system, is provided. The method includes: generating a bit stream concatenated in order of $1^{st}$ UCI and $2^{nd}$ UCI, wherein the $1^{st}$ UCI includes acknowledgement/not-acknowledgement (ACK/NACK), the $2^{nd}$ UCI is periodic channel state information (CSI), and the concatenated bit stream is obtained in such a manner that bits indicating the $2^{nd}$ UCI are appended at the end of bits indicating the $1^{st}$ UCI; if the number of bits of the concatenated bit stream has a specific range, aligning the concatenated bit stream in order of a $1^{st}$ segment and a $2^{nd}$ segment, wherein the $1^{st}$ segment includes bits of which a bit index of the concatenated bit stream is an even number and the $2^{nd}$ segment includes bits of which a bit index of the concatenated bit stream is an odd number; performing channel-coding on each of the $1^{st}$ segment and the $2^{nd}$ segment; and transmitting the channel-coded UCI.

In the aforementioned aspect of the present invention, the specific range may be greater than 11 and less than or equal to 22.

In addition, each of the $1^{st}$ segment and the $2^{nd}$ segment may be channel-coded by a Reed Muller (RM) code.

In addition, if the $1^{st}$ UCI includes ACK/NACK and scheduling request (SR), the concatenated bit stream may be obtained by appending bits indicating the periodic CSI at the end of a bit stream concatenated in order of a bit indicating the ACK/NACK and bits indicating the SR.

In addition, the bit indicating the SR may be one bit.

In addition, the $1^{st}$ UCI and the $2^{nd}$ UCI may be configured to be transmitted in the same uplink subframe, and the configuration may be received by a higher layer signal.

In addition, the method may further include interleaving the channel-coded UCI, wherein the interleaving is to alternately concatenate 2 bits obtained from each of bits of the channel-coded 1st segment and 2nd segment.

According to another aspect of the present invention, an apparatus for transmitting uplink control information is provided. The apparatus includes: a radio frequency (RF) unit for transmitting or receiving a radio signal; and a processor operatively coupled to the RF unit, wherein the processor is configured for: generating a bit stream concatenated in order of 1st UCI and 2nd UCI, wherein the 1st UCI includes acknowledgement/not-acknowledgement (ACK/NACK), the 2nd UCI is periodic channel state information (CSI), and the concatenated bit stream is obtained in such a manner that bits indicating the 2nd UCI are appended at the end of bits indicating the 1st UCI; if the number of bits of the concatenated bit stream has a specific range, aligning the concatenated bit stream in order of a 1st segment and a 2nd segment, wherein the 1st segment includes bits of which a bit index of the concatenated bit stream is an even number and the 2nd segment includes bits of which a bit index of the concatenated bit stream is an odd number; performing channel-coding on each of the 1st segment and the 2nd segment; and transmitting the channel-coded UCI.

When there is a need to transmit different types of uplink control information (UCI) in the same subframe, it can be effectively multiplexed and transmitted.

DESCRIPTION OF EXEMPLARY EMBODIMENTS

Figure 1:
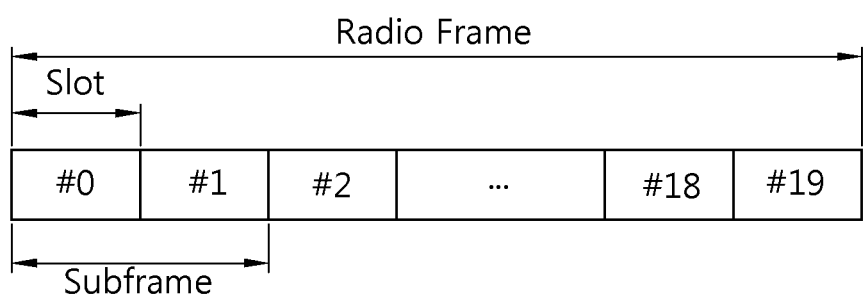
FIG. 1 shows a structure of a radio frame in 3rd generation partnership project (3GPP) long term evolution (LTE).

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE. Although the following description focuses on LTE/LTE-A for clarity, the technical features of the present invention are not limited thereto.

A wireless communication system includes at least one base station (BS). Each BS provides a communication service to a specific geographical region. A user equipment (UE) may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS is generally a fixed station that communicates with the UE and may be referred to as another terminology, such as an evolved Node-B (eNB), a base transceiver system (BTS), an access point, etc.

The UE belongs to one cell in general. A cell to which the UE belongs is called a serving cell. A BS which provides a communication service to the serving cell is called a serving BS. The serving BS may provide one or a plurality of serving cells.

This technique can be used in a downlink or an uplink. In general, the downlink implies communication from the BS to the UE, and the uplink implies communication from the UE to the BS.

Layers of a radio interface protocol between the UE and the BS can be classified into a first layer (L1), a second layer (L2), and a third layer (L3) based on the lower three layers of the open system interconnection (OSI) model that is well-known in the communication system.

A physical layer, i.e., the first layer, is connected to a medium access control (MAC) layer, i.e., a higher layer, through a transport channel. Data between the MAC and physical layers is transferred through the transport channel. Further, between different physical layers, i.e., between a physical layer of a transmitting side and a physical layer of a receiving side, data is transferred through a physical channel.

A radio data link layer, i.e., the second layer, consists of a MAC layer, an RLC layer, and a PDCP layer. The MAC layer is a layer that manages mapping between a logical channel and the transport channel. The MAC layer selects a proper transport channel to transmit data delivered from the RLC layer, and adds essential control information to a header of a MAC protocol data unit (PDU).

The RLC layer is located above the MAC layer and supports reliable data transmission. In addition, the RLC layer segments and concatenates RLC service data units (SDUs) delivered from an upper layer to configure data having a suitable size for a radio section. The RLC layer of a receiver supports a reassemble function of data to restore an original RLC SDU from the received RLC PDUs.

The PDCP layer is used only in a packet exchange area, and can perform transmission by compressing a header of an IP packet to increase transmission efficiency of packet data in a radio channel.

The RRC layer, i.e., the third layer, exchanges radio resource control information between the UE and the network in addition to controlling of a lower layer. According to a communication state of the UE, various RRC states (e.g., an idle mode, an RRC connected mode, etc.) are defined, and transition between the RRC states is optionally possible. In the RRC layer, various procedures related to radio resource management are defined such as system information broadcasting, an RRC access management procedure, a multiple component carrier setup procedure, a radio bearer control procedure, a security procedure, a measurement procedure, a mobility management procedure (handover), etc.

The wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality of receive antennas. Hereinafter, a transmit (Tx) antenna implies a physical or logical antenna used to transmit one signal or stream, and a receive (Rx) antenna implies a physical or logical antenna used to receive one signal or stream.

FIG. 1 shows a structure of a radio frame in 3GPP LTE.

The section 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)" can be incorporated herein by reference. Referring to FIG. 1, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in downlink transmission, the OFDM symbol is for representing one symbol period, and can be referred to as other terms. For example, the OFDM symbol can also be referred to as an SC-FDMA symbol when SC-FDMA is used as an uplink multiple-access scheme. A resource block (RB) is a resource allocation unit, and includes a plurality of consecutive subcarriers in one slot. The above radio frame structure is shown for exemplary purposes only. Thus, the number of subframes included in the radio frame, the number of slots included in the subframe, or the number of OFDM symbols included in the slot may change variously.

In 3GPP LTE, it is defined such that one slot includes 7 OFDM symbols in a normal cyclic prefix (CP) and one slot includes 6 OFDM symbols in an extended CP.

A wireless communication system can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band. A channel response based on the TDD scheme is reciprocal in practice. This implies that a downlink channel response is almost identical to an uplink channel response in a given frequency domain. Therefore, in a TDD-based wireless communication system, the downlink channel response can be advantageously obtained from the uplink channel response. In the TDD scheme, a full frequency band is time-divided into UL transmission and DL transmission, and thus DL transmission performed by a BS and UL transmission performed by a UE can be simultaneously achieved. In a TDD system in which UL transmission and DL transmission are divided on a subframe basis, UL transmission and DL transmission are performed in different subframes.

Figure 2:
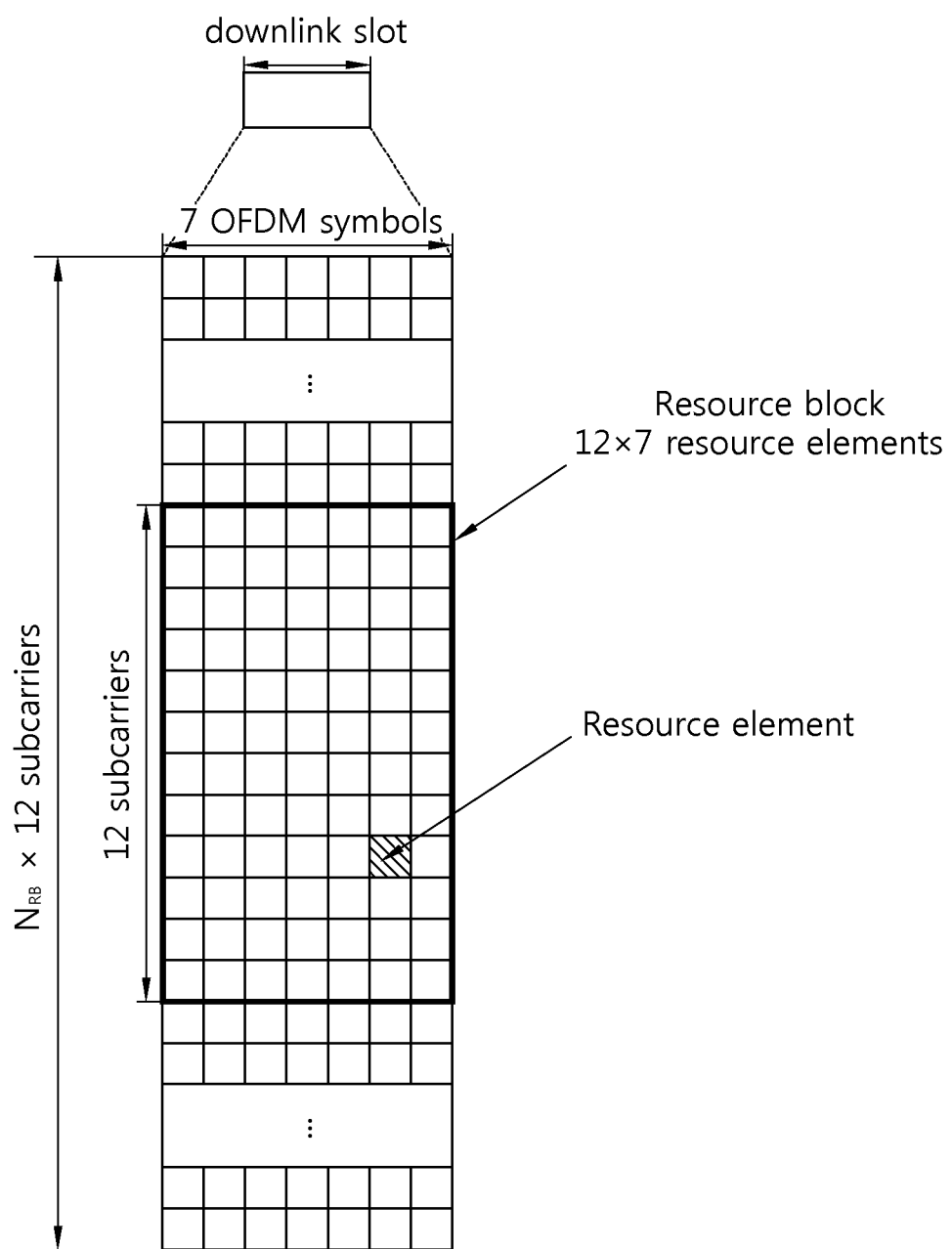
FIG. 2 shows an example of a resource grid for one downlink (DL) slot.

FIG. 2 shows an example of a resource grid for one DL slot.

The DL slot includes a plurality of OFDM symbols in a time domain, and includes $N_{RB}$ resource blocks (RBs) in a frequency domain. The number $N_{RB}$ of RBs included in the DL slot depends on a DL transmission bandwidth configured in a cell. For example, in the LTE system, $N_{RB}$ may be any one value in the range of 6 to 110. One RB includes a plurality of subcarriers in a frequency domain. A structure of a UL slot may be the same as the aforementioned structure of the DL slot.

Each element on the resource grid is referred to as a resource element (RE). The RE on the resource grid can be identified by an index pair (k,l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described herein that one RB consists of 7 OFDM symbols in the time domain and 12 subcarriers in the frequency domain and thus includes 7×12 REs, this is for exemplary purposes only. Therefore, the number of OFDM symbols and the number of subcarriers in the RB are not limited thereto. The number of OFDM symbols and the number of subcarriers may change variously depending on a CP length, a frequency spacing, etc. For example, the number of OFDM symbols is 7 in a normal CP case, and the number of OFDM symbols is 6 in an extended CP case. The number of subcarriers in one OFDM symbol may be selected from 128, 256, 512, 1024, 1536, and 2048.

Figure 3:
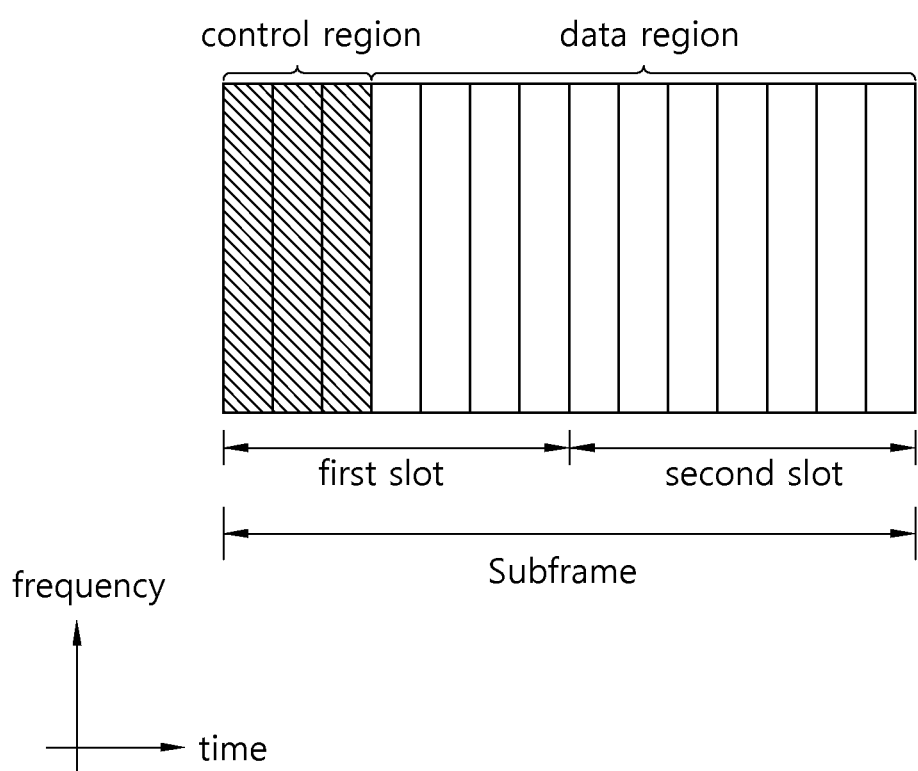
FIG. 3 shows a structure of a DL subframe.

FIG. 3 shows a structure of a downlink subframe.

The downlink subframe includes two slots in a time domain. Each slot includes 7 OFDM symbols in a normal CP case. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region.

A physical downlink control channel (PDCCH) can carry a downlink shared channel (DL-SCH)'s resource allocation (referred to as a downlink (DL) grant) and transmission format, uplink shared channel (UL-SCH)'s resource allocation information (referred to as an uplink (UL) grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region, and the UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
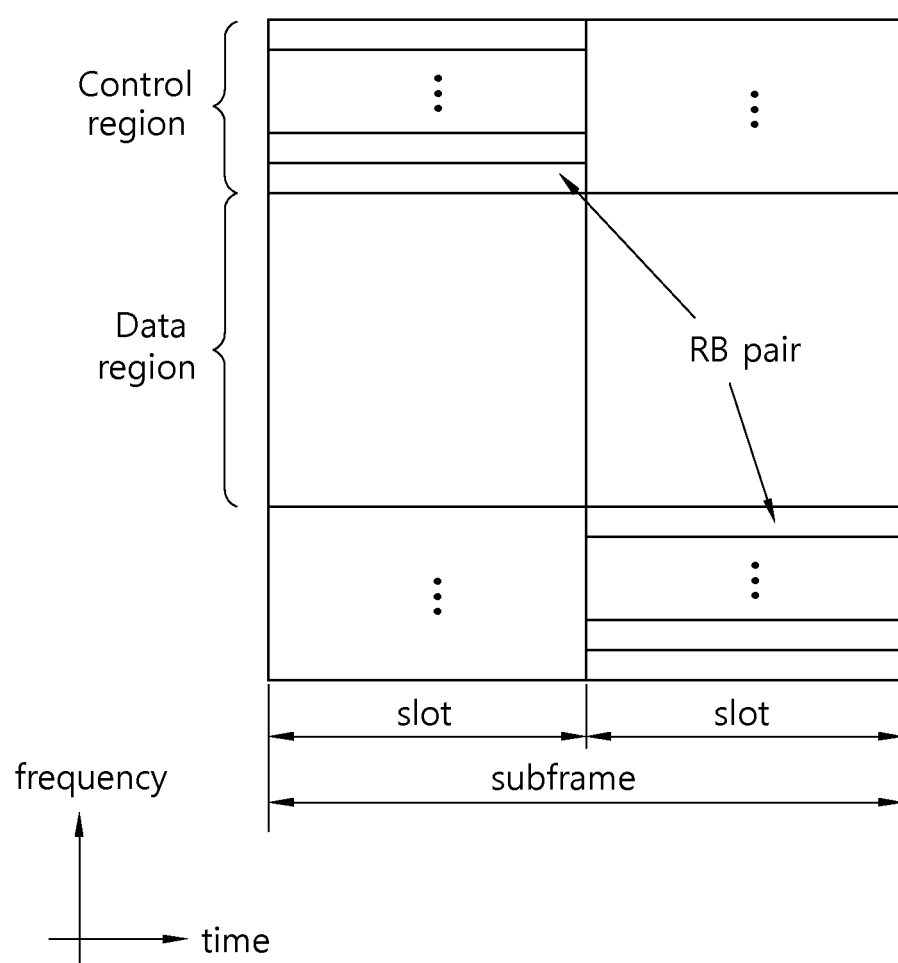
FIG. 4 shows a structure of an uplink (UL) subframe.

FIG. 4 shows a structure of an uplink subframe.

The uplink subframe can be divided into a control region and a data region. A physical uplink control channel (PUCCH) for carrying uplink control information (UCI) is allocated to the control region. A physical uplink shared channel (PUSCH) for carrying uplink data is allocated to the data region.

When indicated by a higher layer, a UE may support simultaneous transmission of the PUSCH and the PUCCH.

The PUCCH for one UE is allocated in an RB pair in a subframe. RBs belonging to the RB pair occupy different subcarriers in each of a $1^{st}$ slot and a $2^{nd}$ slot. That is, a frequency occupied by the RBs belonging to the RB pair to which the PUCCH is allocated changes at a slot boundary. This is called that the RB pair allocated to the PUCCH is frequency-hopped at the slot boundary. Since the UE transmits the UCI on a time basis through different subcarriers, a frequency diversity gain can be obtained.

The PUSCH is a channel mapped to a UL-SCH (uplink shared channel) which is a transport channel. Uplink data transmitted through the PUSCH may be a transport block which is a data block for the UL-SCH transmitted during a TTI. The transport block may include user information. In addition, the uplink data may be multiplexed data. The multiplexed data may be obtained by multiplexing control information and a transport block for the UL-SCH. Examples of the control information multiplexed to the data may include CQI, PMI (precoding matrix indicator), HARQ ACK/NACK, RI (rank indicator), etc. Alternatively, the uplink data may consist of only the control information.

Meanwhile, a wireless communication system may be a carrier aggregation system. Herein, carrier aggregation is when a broadband is configured by aggregating one or more carriers having a smaller bandwidth than the broadband. The carrier aggregation system can configure a broadband by aggregating one or more component carriers (CCs) having a bandwidth smaller than that of a target broadband when the wireless communication system intends to support the broadband.

Figure 5:
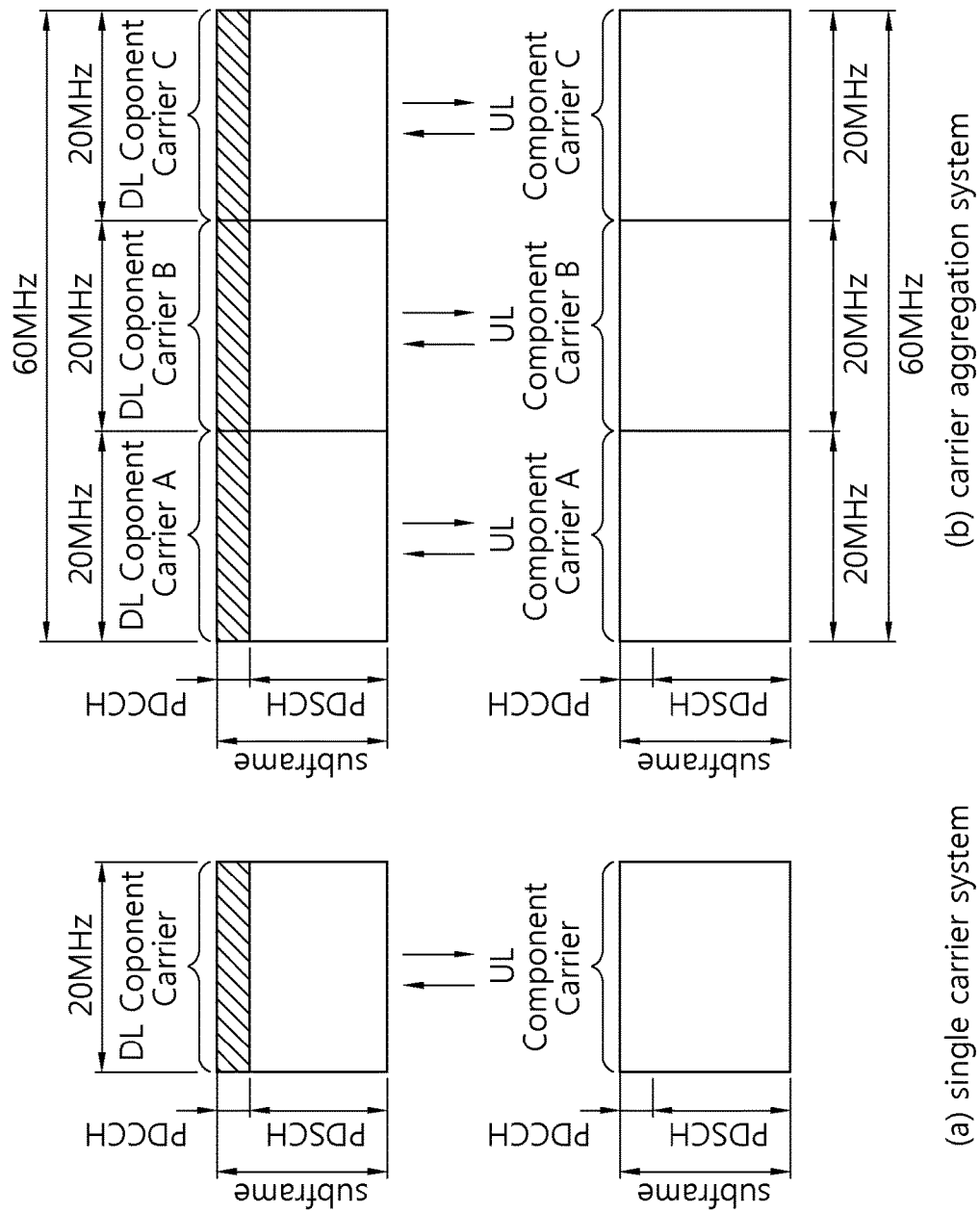
FIG. 5 shows an example of comparing a single-carrier system and a carrier aggregation system.

FIG. 5 shows an example of comparing a single-carrier system and a carrier aggregation system.

Referring to FIG. 5, only one carrier is supported for a UE in an uplink and a downlink in the single-carrier system. Although the carrier may have various bandwidths, only one carrier is assigned to the UE. Meanwhile, multiple component carriers (CCs) can be assigned to the UE in the carrier aggregation system. For example, three 20 MHz CCs can be assigned to allocate a 60 MHz bandwidth to the UE. The CC includes a DL CC and a UL CC.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure.

The secondary cell implies a cell which operates at a secondary frequency, and is configured when an RRC connection is once established and is used to provide an additional radio resource.

The serving cell is configured with the primary cell in case of a UE of which CA is not configured or which cannot provide the CA. If the CA is configured, the term 'serving cell' is used to indicate a set consisting of a primary cell and one or a plurality of cells among all secondary cells That is, the primary cell implies one serving cell that provides a security input and NAS mobility information in an RRC establishment or re-establishment state. According to UE capabilities, it can be configured such that at least one cell constitutes a serving cell set together with the primary cell, and in this case, the at least one cell is called the secondary cell.

Therefore, a set of serving cells assigned to only one UE can consist of only one primary cell, or can consist of one primary cell and at least one secondary cell.

A primary component carrier (PCC) denotes a CC corresponding to a primary cell. The PCC is a CC that establishes an initial connection (or RRC connection) with the BS among several CCs. The PCC serves for connection (or RRC connection) for signaling related to a plurality of CCs, and is a CC that manages UE context which is connection information related to the UE. In addition, the PCC establishes connection with the UE, and thus always exists in an activation state when in an RRC connected mode.

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be divided into an activation state and a deactivation state.

A downlink CC corresponding to the primary cell is called a downlink primary component carrier (DL PCC), and an uplink CC corresponding to the primary cell is called an uplink primary component carrier (UL PCC). In addition, in a downlink, a CC corresponding to the secondary cell is called a DL secondary CC (SCC). In an uplink, a CC corresponding to the secondary cell is called a UL SCC.

The primary cell and the secondary cell have the following features.

First, the primary cell is used for PUCCH transmission.

Second, the primary cell is always activated, whereas the secondary cell is a cell which is activated/deactivated according to a specific condition.

Third, when the primary cell experiences a radio link failure (RLF), RRC re-establishment is triggered, whereas when the secondary cell experiences the RLF, the RRC re-establishment is not triggered.

Fourth, the primary cell can change by a handover procedure accompanied by a random access channel (RACH) procedure or security key modification.

Fifth, non-access stratum (NAS) information is received through the primary cell.

Sixth, the primary cell always consists of a pair of a DL PCC and a UL PCC.

Seventh, for each UE, a different CC can be configured as the primary cell.

Eighth, a procedure such as reconfiguration, adding, and removal of the primary cell can be performed by an RRC layer. When adding a new secondary cell, RRC signaling can be used for transmission of system information of a dedicated secondary cell.

A DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, the carrier aggregation system can support multiple CCs unlike a single carrier system. That is, one UE may receive a plurality of PDSCHs through a plurality of DL CCs. In addition, the UE may transmit ACK/NACK for the plurality of PDSCHs through one UL CC, e.g., UL PCC. That is, in the conventional single carrier system, since only one PDSCH is received in one subframe, it is enough to transmit up to two pieces of HARQ ACK/NACK (hereinafter, simply called ACK/NACK) information. However, in the carrier aggregation system, since ACK/NACK for a plurality of PDSCHs can be transmitted through one UL CC, a method of transmitting the ACK/NACK is required.

Now, the conventional PUCCH format will be described.

The PUCCH carries various types of control information according to a format. A PUCCH format 1 carries a scheduling request (SR). In this case, an on-off keying (OOK) scheme can be used. A PUCCH format 1a carries an ACK/NACK modulated using bit phase shift keying (BPSK) with respect to one codeword. A PUCCH format 1b carries an ACK/NACK modulated using quadrature phase shift keying (QPSK) with respect to two codewords. A PUCCH format 2 carries a channel quality indicator (CQI) modulated using QPSK. PUCCH formats 2a and 2b carry the CQI and the ACK/NACK.

Table 1 shows a modulation scheme and the number of bits in a subframe according to a PUCCH format.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Figure 6:
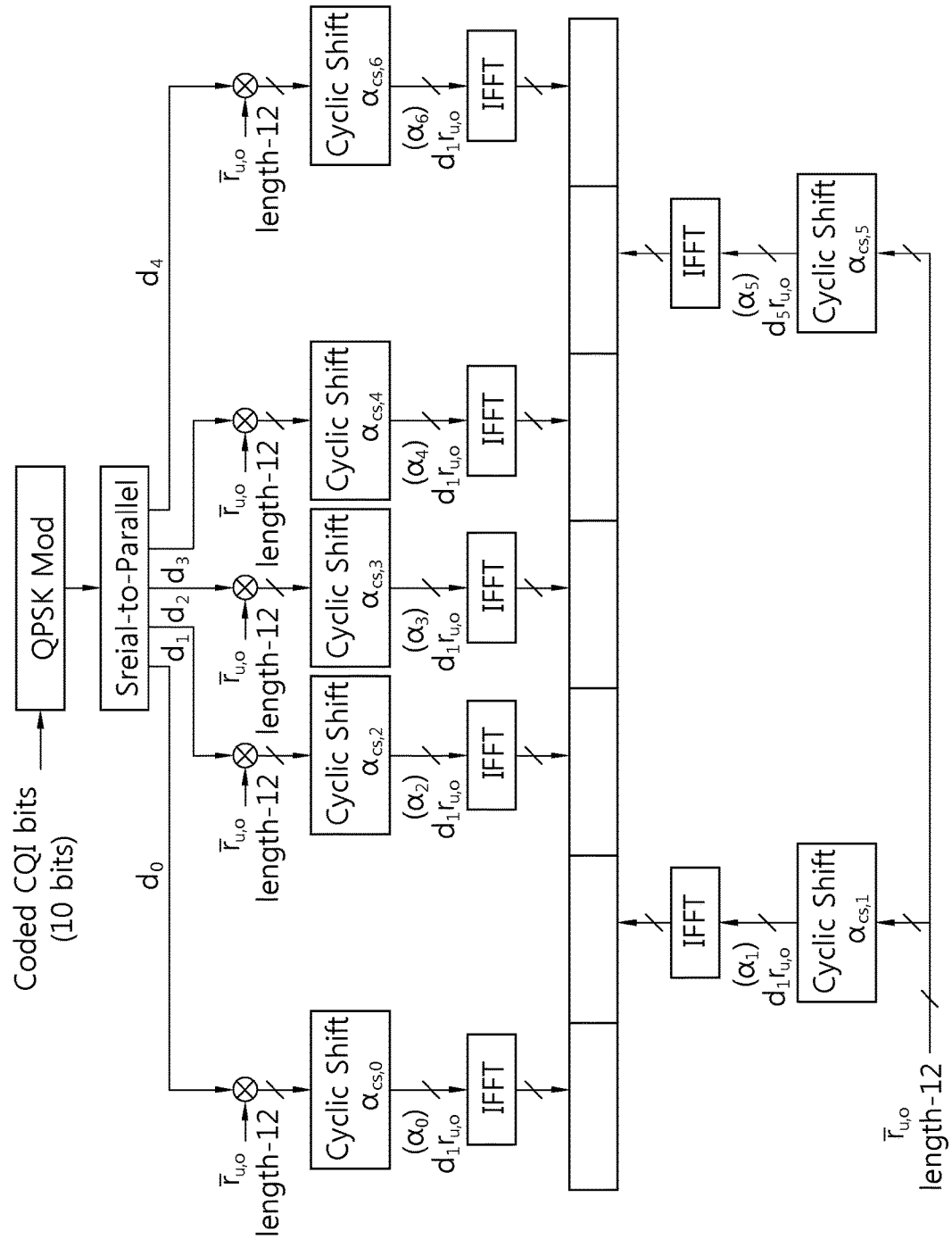
FIG. 6 shows a channel structure of physical uplink control channel (PUCCH) formats 2/2a/2b for one slot in a normal cyclic prefix (CP) case.

FIG. 6 shows a channel structure of PUCCH formats 2/2a/2b for one slot in a normal CP case. As described above, the PUCCH formats 2/2a/2b are used in CQI transmission.

Referring to FIG. 6, in the normal CP case, SC-FDMA symbols 1 and 5 are used for a demodulation reference signal (DM RS) which is an uplink reference signal. In an extended CP case, an SC-FDMA symbol 3 is used for the DM RS.

10 CQI information bits are channel coded, for example, with a coding rate of ½, to generate 20 coded bits. A Reed-Muller code can be used in the channel coding. After scheduling, QPSK constellation mapping is performed to generate QPSK modulation symbols (e.g., $d_0$ to $d_4$ in a slot 0). Each QPSK modulation symbol is subjected to IFFT after being modulated by using a cyclic shift of a base RS sequence having a length of 12, and is then transmitted in each of 10 SC-FDMA symbols in a subframe. 12 equally-spaced cyclic shifts allow 12 different UEs to be orthogonally multiplexed on the same PUCCH RB. A DM RS sequence applied to the SC-FDMA symbols 1 and 5 may be the base RS sequence having a length of 12.

Figure 7:
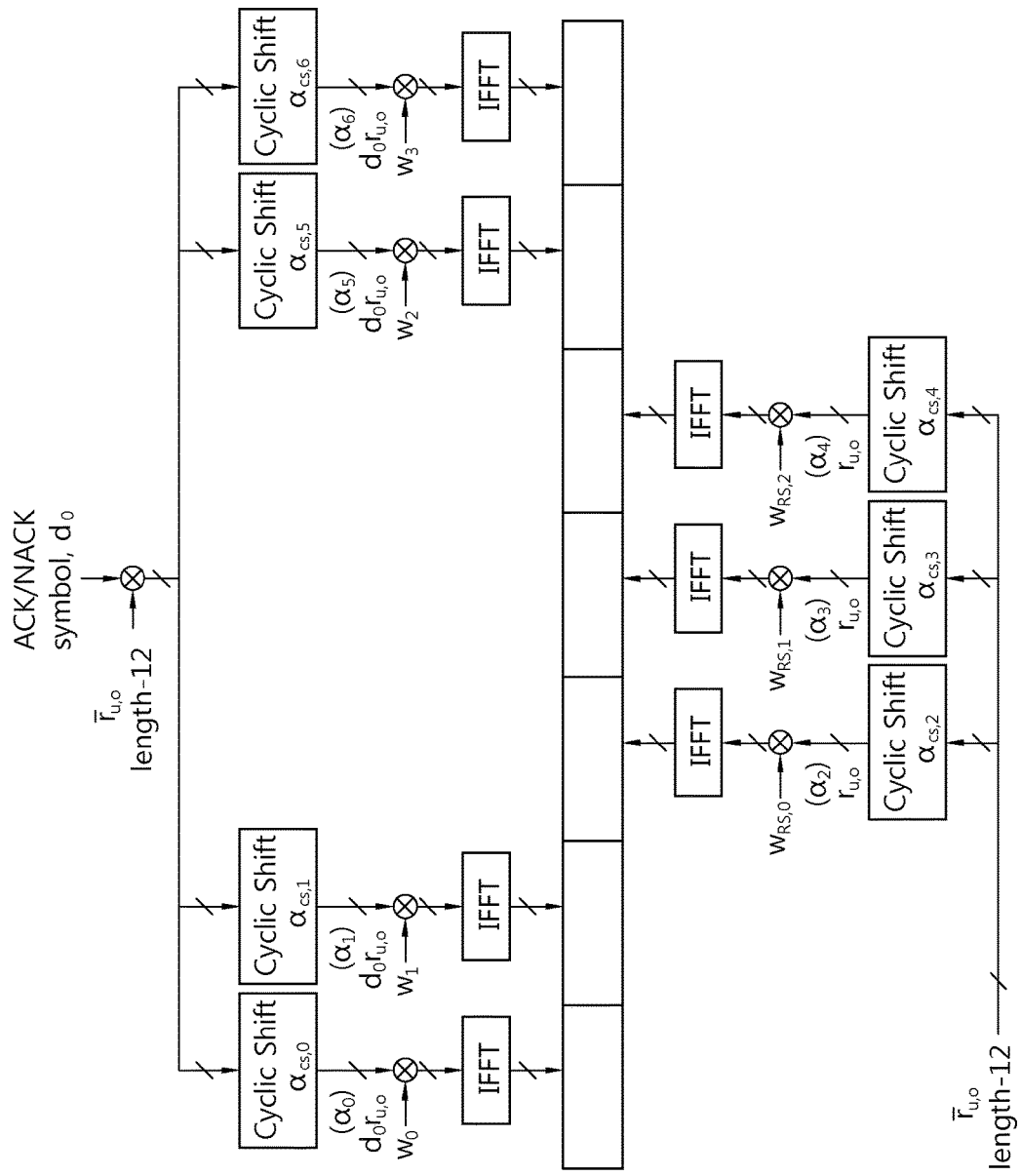
FIG. 7 shows a PUCCH format 1a/1b for one slot in a normal CP case.

FIG. 7 shows a PUCCH format 1a/1b for one slot in a normal CP case. Uplink reference signals are transmitted in $3^{rd}$ to $5^{th}$ SC-FDMA symbols. In FIG. 7, $w_0$, $w_1$, $w_2$ and $w_3$ can be modulated in a time domain after inverse fast Fourier transform (IFFT) modulation, or can be modulated in a frequency domain before IFFT modulation.

In LTE, simultaneous transmission of ACK/NACK and CQI in the same subframe may be enabled or disabled. In a case where simultaneous transmission of the ACK/NACK and the CQI is disabled, a UE may need to transmit the ACK/NACK on a PUCCH of a subframe in which CQI feedback is configured. In this case, the CQI is dropped, and only the ACK/NACK is transmitted using the PUCCH formats 1a/1b.

Simultaneous transmission of the ACK/NACK and the CQI in the same subframe can be achieved through UE-specific higher layer signaling. When simultaneous transmission is enabled, 1-bit or 2-bit ACK/NACK information needs to be multiplexed to the same PUCCH RB in a subframe in which a BS scheduler permits simultaneous transmission of the CQI and the ACK/NACK. In this case, it is necessary to preserve a single-carrier property having a low cubic metric (CM). A method of multiplexing the CQI and the ACK/NACK while preserving the single-carrier property is different between a normal CP case and an extended CP case.

First, when 1-bit or 2-bit ACK/NACK and CQI are transmitted together by using the PUCCH formats 2a/2b in the normal CP case, ACK/NACK bits are not scrambled, and are subjected to BPSK (in case of 1 bit)/QPSK (in case of 2 bits) modulation to generate a single HARQ ACK/NACK modulation symbol $d_{HARQ}$. The ACK is encoded as a binary '1', and the NACK is encoded as a binary '0'. The single HARQ ACK/NACK modulation symbol $d_{HARQ}$ is used to modulate a second RS symbol in each slot. That is, the ACK/NACK is signaled by using an RS.

Figure 8:
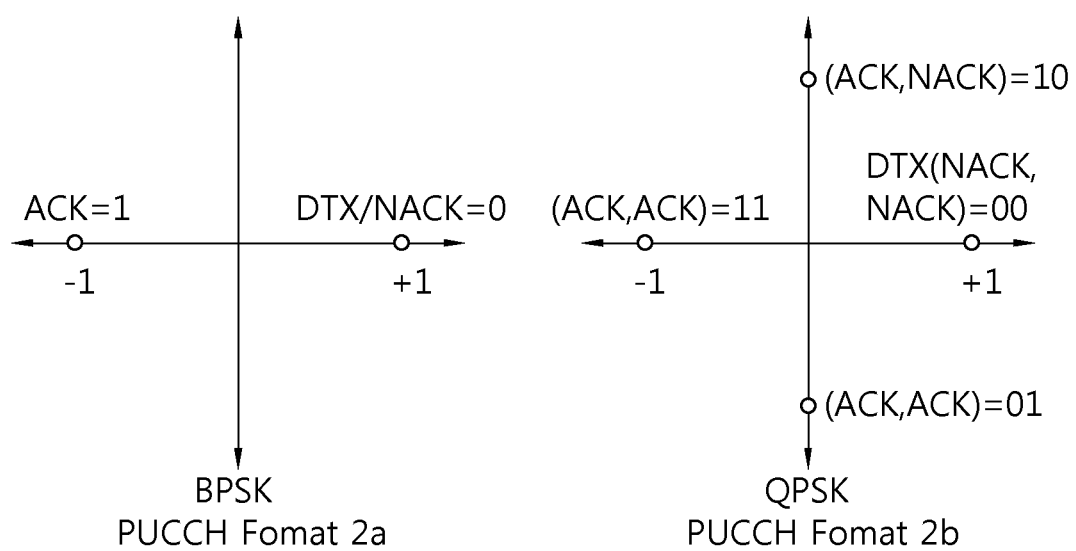
FIG. 8 shows an example of constellation mapping of acknowledgement/non-acknowledgement (ACK/NACK) in a normal CP case and a PUCCH format 2a/2b.

FIG. 8 shows an example of constellation mapping of ACK/NACK in a normal CP case and a PUCCH format 2a/2b.

Referring to FIG. 8, NACK (or NACK/NACK in case of transmission of two DL codewords) is mapped to +1. In discontinuous transmission (DTX) which implies a case where a UE fails to detect a DL grant, neither ACK nor NACK is transmitted, and a default NACK is set in this case. The DTX is interpreted as NACK by a BS, and causes DL retransmission.

Next, 1- or 2-bit ACK/NACK is joint-coded with CQI in an extended CP case in which one RS symbol is used per slot.

Figure 9:
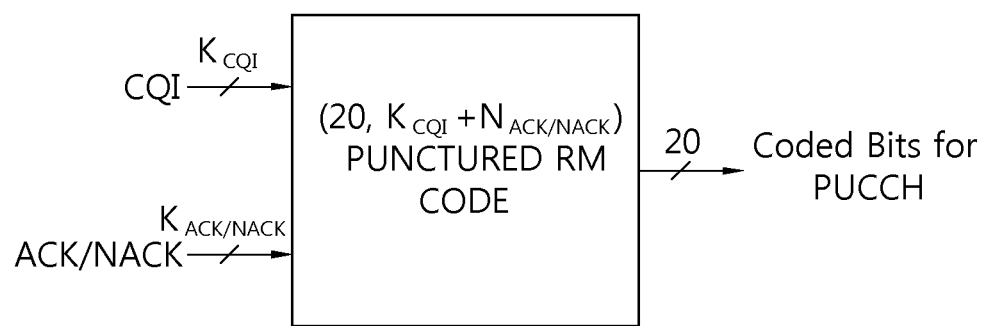
FIG. 9 shows an example of joint coding between ACK/NACK and channel quality indicator (CQI) in an extended CP case.

FIG. 9 shows an example of joint coding between ACK/NACK and CQI in an extended CP case.

Referring to FIG. 9, a maximum number of bits of an information bit supported by an RM code may be 13. In this case, a CQI information bit $K_{cqi}$ may be 11 bits, and an ACK/NACK bit $K_{ACK/NACK}$ may be 2 bits. The CQI information bit and the ACK/NACK information bit are concatenated to generate a bit stream and thereafter may be subjected to channel coding by the RM code. In this case, it is expressed such that the CQI information bit and the ACK/NACK information bit are joint-coded. That is, the CQI information bit and the ACK/NACK information bit are joint-coded by an RM code into 20-bit coded bits. The 20-bit codeword generated in this process is transmitted through a PUCCH format 2 having the channel structure described in FIG. 6 (in an extended CP case, one RS symbol is used per slot unlike in FIG. 6).

In LTE, ACK/NACK and SR may be multiplexed and thus be simultaneously transmitted by using the PUCCH formats 1a/1b.

Figure 10:
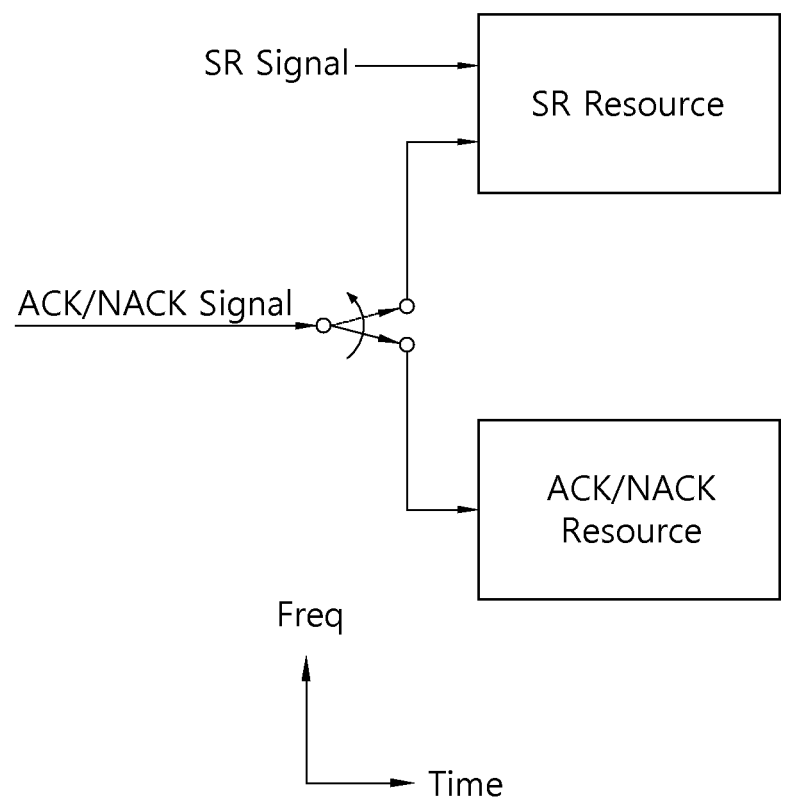
FIG. 10 shows a method of multiplexing ACK/NACK and scheduling request (SR).

FIG. 10 shows a method of multiplexing ACK/NACK and SR.

Referring to FIG. 10, when ACK/NACK and SR are transmitted simultaneously in the same subframe, a UE transmits the ACK/NACK by using an allocated SR resource. In this case, the SR implies positive SR. In addition, the UE may transmit ACK/NACK by using an allocated ACK/NACK resource. In this case, the SR implies negative SR. That is, according to which resource is used to transmit ACK/NACK in a subframe in which the ACK/NACK and the SR are simultaneously transmitted, a BS can identify not only the ACK/NACK but also whether the SR is positive SR or negative SR.

Figure 11:
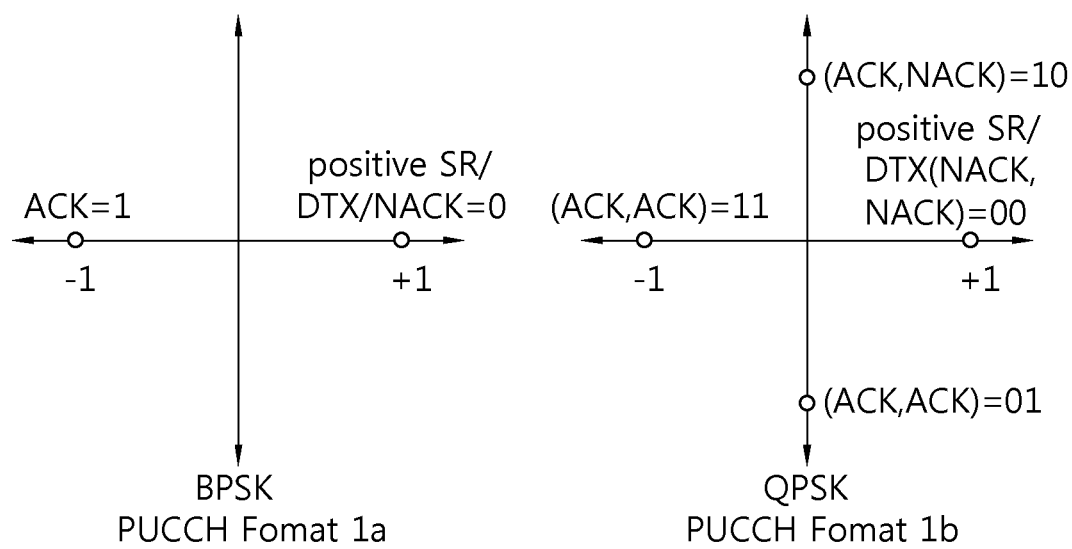
FIG. 11 shows constellation mapping when ACK/NACK and SR are simultaneously transmitted.

FIG. 11 shows constellation mapping when ACK/NACK and SR are simultaneously transmitted.

Referring to FIG. 11, DTX/NACK and positive SR are mapped to +1 of a constellation map, and ACK is mapped to −1.

Meanwhile, in the LTE TDD system, a UE can feed back multiple ACK/NACK for multiple PDSCHs to a BS. This is because the UE can receive the multiple PDSCHs in multiple subframes, and can transmit ACK/NACK for the multiple PDSCHs in one subframe. In this case, there are two types of ACK/NACK transmission methods as follows.

The first method is ACK/NACK bundling. The ACK/NACK bundling is a process of combining ACK/NACK bits for multiple data units by using a logical AND operation. For example, if the UE decodes all the multiple data units successfully, the UE transmits only one ACK bit. Otherwise, if the UE fails in decoding (or detecting) any one of the multiple data units, the UE may transmit NACK or may transmit no signal as ACK/NACK.

The second method is ACK/NACK multiplexing. With ACK/NACK multiplexing, the content and meaning of the ACK/NACK for the multiple data units can be identified by combining a PUCCH resource used in actual ACK/NACK transmission and one of QPSK modulation symbols.

For example, it is assumed that up to two data units can be transmitted, and one PUCCH resource can carry two bits. It is also assumed that an HARQ operation for each data unit can be managed by one ACK/NACK bit. In this case, the ACK/NACK can be identified at a transmitting node (e.g., a BS) which transmits the data unit according to Table 2 below.

TABLE 2

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

In Table 2, HARQ-ACK(i) indicates an ACK/NACK result for a data unit i. In the above example, two data units may exist, i.e., a data unit 0 and a data unit 1. In Table 2, DTX implies that there is no data unit transmission for the HARQ-ACK(i). Alternatively, it implies that a receiving end (e.g., a UE) fails to detect the data unit for the HARQ-ACK(i). $n^{(1)}_{PUCCH,X}$ indicates a PUCCH resource used in actual ACK/NACK transmission. There are up to 2 PUCCH resources, that is, $n^{(1)}_{PUCCH,0}$ and $n^{(1)}_{PUCCH,1}$. b(0) and b(1) denote 2 bits delivered by a selected PUCCH resource. A modulation symbol transmitted using the PUCCH resource is determined by b(0) and b(1).

For one example, if the receiving end successfully receives two data units and decodes the received data units, the receiving end has to transmit two bits b(0) and b(1) in a form of (1, 1) by using a PUCCH resource $n^{(1)}_{PUCCH,1}$. For another example, it is assumed that the receiving end receives two data units, and in this case, the receiving end fails to decode $1^{st}$ data unit and successfully decodes $2^{nd}$ data unit. Then, the receiving end has to transmit (0, 0) by using $n^{(1)}_{PUCCH,1}$.

As such, according to a method in which the content (or meaning) of ACK/NACK is linked to a combination of a PUCCH resource and the content of an actual bit transmitted using the PUCCH resource, ACK/NACK transmission for the multiple data units is enabled by using a single PUCCH resource.

In the ACK/NACK multiplexing method, if at least one ACK exists for all data units, NACK and DTX are basically coupled as NACK/DTX. This is because a combination of a PUCCH resource and a QPSK symbol is not enough to cover all ACK/NACK combinations based on decoupling of the NACK and the DTX.

In the aforementioned ACK/NACK bundling or channel selection, the total number of PDSCHs for which ACK/NACK is transmitted by the UE is important. If the UE fails to receive some of the plurality of PDCCHs for scheduling a plurality of PDSCHs, an error occurs in the total number of PDSCHs for which the ACK/NACK is transmitted, and thus ACK/NACK may be transmitted erroneously. To correct this error, a TDD system transmits the PDCCH by including a downlink assignment index (DAI). The DAI reports a counting value by counting the number of PDCCHs for scheduling the PDSCHs.

Hereinafter, a method of coding an uplink channel for a PUCCH format 2 will be described.

Table 3 below shows an example of a (20,A) RM code used in channel coding of a PUCCH format 2. Herein, A may denote the number of bits (i.e., $K_{cqi}+K_{ACK/NACK}$) of a bit stream in which a CQI information bit and an ACK/NACK information bit are concatenated. If the bit stream is denoted by $a_0, a_1, a_2, \ldots, a_{A-1}$, the bit stream can be used as an input of a channel coding block using the (20,A) RM code.

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Bits $b_0, b_1, b_2, \ldots, b_{B-1}$ which are channel-coded by an RM code can be generated by Equation 1 below.

$$b_i = \sum_{n=0}^{A-1} (a_n \cdot M_{i,n}) \bmod 2 \quad \text{[Equation 1]}$$

In Equation 1 above, i=0, 1, 2, . . . , B−1, where B=20.

Channel-coded bits are mapped to a code-time-frequency resource.

Figure 12:
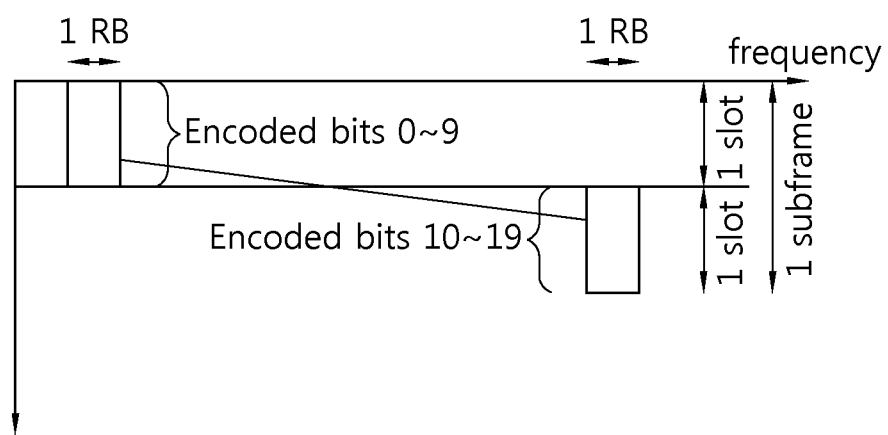
FIG. 12 shows an example of mapping channel-coded bits to a code-time-frequency resource.

FIG. 12 shows an example of mapping channel-coded bits to a code-time-frequency resource.

Referring to FIG. 12, among channel-coded 20 bits, first 10 bits and last 10 bits are mapped to different code-time-frequency resources. In particular, the first 10 bits and the last 10 bits are transmitted by being separated significantly in a frequency domain for frequency diversity.

Now, an example of an uplink channel coding method in LTE-A will be described.

As described above, in LTE, if UCI is transmitted with a PUCCH format 2, CSI of up to 13 bits is subjected to RM coding by using the (20, A) RM code of Table 3. Otherwise, if the UCI is transmitted through a PUSCH, CQI of up to 11 bits is subjected to RM coding through (32, A) RM code of Table 4 below, and truncation or circular repetition is performed to conform to a code rate at which transmission is performed through the PUSCH.

sequence obtained by modulating a multi-bit ACK/NACK is transmitted by being spread, by using a block spreading coding, in a time domain.

Figure 13:
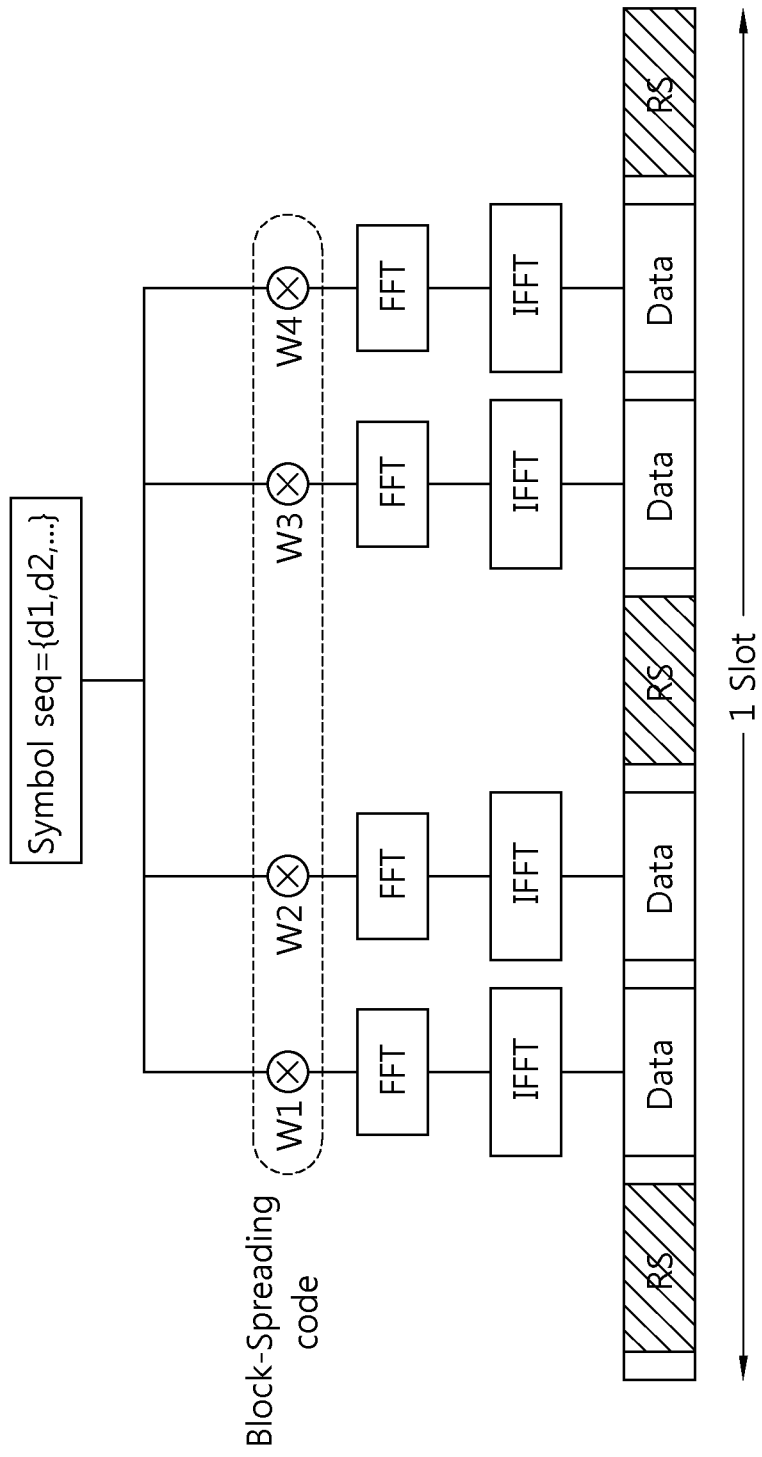
FIG. 13 shows an example of a channel structure of a PUCCH format 3.

FIG. 13 shows an example of a channel structure of a PUCCH format 3.

Referring to FIG. 13, a modulation symbol sequence {d1, d2, . . . } is spread in a time domain by applying a block spreading code. The block spreading code may be an orthogonal cover code (OCC). Herein, a modulation symbol sequence may be a sequence of modulation symbols in which multi-bit ACK/NACK information bits are subjected to channel coding (by using an RM code, a TBCC, a punctured RM code, etc.) to generate an ACK/NACK coded bit and in which the ACK/NACK coded bits are modulated (e.g., QPSK). The sequence of the modulation symbols is transmitted after mapping to data symbols of a slot through fast Fourier transform (FFT) and inverse fast Fourier transform (IFFT). Although it is exemplified in FIG. 13 that two RS symbols are present in one slot, a case where 3 RS symbols are present is also possible, and in this case, a block spreading code having a length of 4 may be used.

Such a PUCCH format 3 can transmit a channel-coded bit of 48 bits in a normal CP. If a UCI bit (i.e., information bit) is less than or equal to 11 bits, the (32, A) RM coding of Table 4 is used, and circular repetition is used to conform to the number of coded bits of the PUCCH format 3. As shown in Table 4, since the (32, A) RM code has only 11 basis

TABLE 4

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 0 | 0 | 0 | 1 | 1 | 1 | 0 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Meanwhile, in LTE-A, a PUCCH format 3 is introduced to transmit UCI (ACK/NACK and SR) of up to 21 bits (i.e., the number of bits before channel coding as information bits).

The PUCCH format 3 is used to perform transmission based on block spreading. That is, a modulation symbol sequences, if a UCI bit is greater than 11 bits, dual RM coding using two (32, A) RM codes is used.

Figure 14:
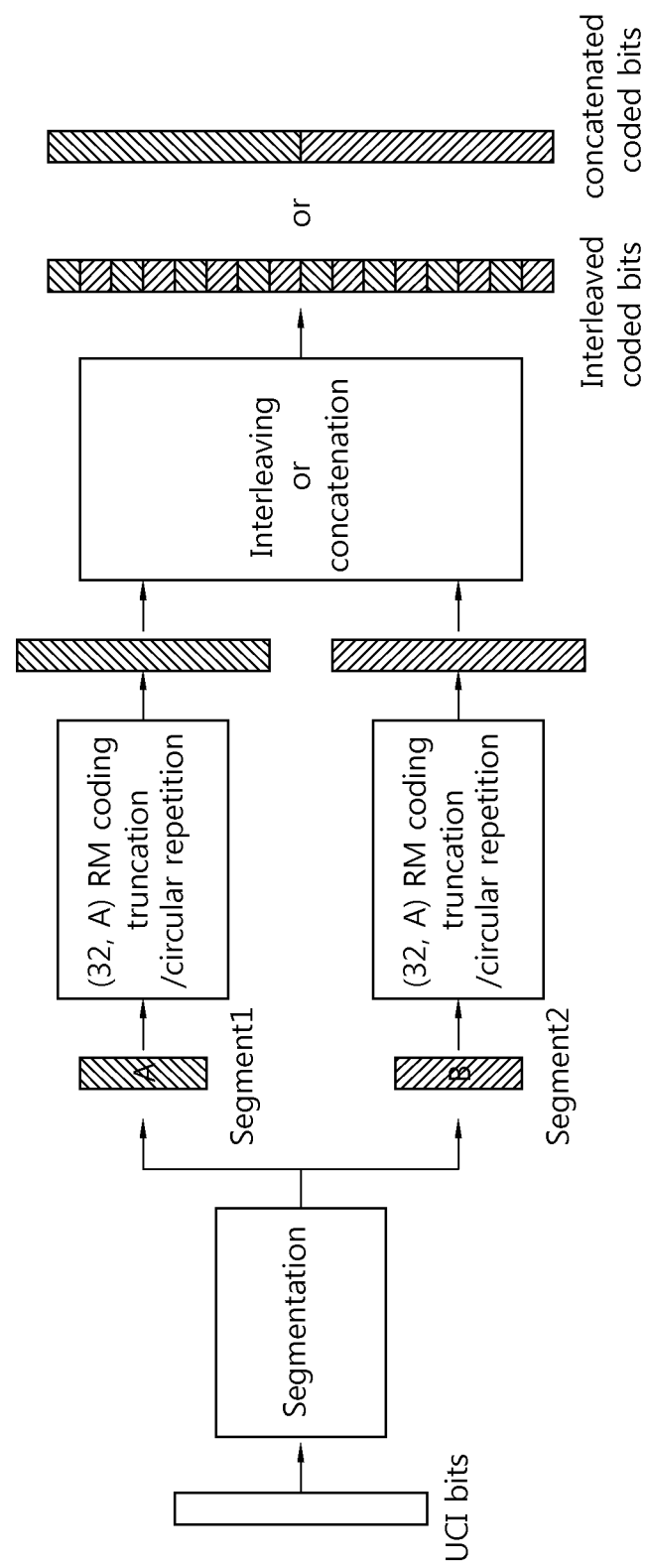
FIG. 14 shows an example of a dual Reed Muller (RM) coding process.

FIG. 14 shows an example of a dual RM coding process.

Referring to FIG. 14, if a UCI bit stream (i.e., information bits) exceeds 11 bits, segmentation is used to generate a segmented bit stream (called a segment). In this case, each of a segment 1 and a segment 2 is less than or equal to 11 bits. Each of the segments 1 and 2 is interleaved or concatenated through the (32, A) RM coding. Thereafter, truncation or circular repetition is transmitted after truncation or circular repetition is performed to conform to the number of coded bits of the PUCCH format 3.

Now, the present invention will be described.

In LTE, if periodic CQI transmission and ACK/NACK transmission collide with each other in a specific subframe, it may be configured such that simultaneous transmission of the period CQI and the ACK/NACK is possible. If the specific subframe is a subframe without PUSCH transmission, ACK/NACK is transmitted by being multiplexed in such a manner that phase modulation is performed on a second reference signal symbol of a PUCCH format 2 in which CQI is transmitted.

However, if PUSCH transmission is not performed in the specific subframe and if periodic CQI and multiple ACK/NACK (e.g., multiple ACK/NACK for multiple PDSCHs) transmission is required, such a conventional method is not appropriate. This is because it is difficult to guarantee reliability when using the conventional method since an ACK/NACK information amount is great. Therefore, there is a need for a new method for multiplexing and transmitting periodic CSI and ACK/NACK through a PUCCH in a subframe without PUSCH transmission.

The present invention proposes a multiplexing method for a case where simultaneous transmission is configured to the same uplink control channel by multiplexing periodic CSI and ACK/NACK and an uplink control channel selection method based on a UCI configuration.

Hereinafter, CSI may be limited to periodic CSI except for aperiodic CSI. Although it is exemplified to use RM coding as channel coding hereinafter for convenience of explanation, the present invention is not limited thereto. In addition, the present invention may also include CQI transmission for a case of a configuration in which a plurality of CSIs are simultaneously transmitted. In addition, although dual RM coding using 2 RM coding blocks is exemplified when using multiple-RM coding, this is not for limiting to use two or more RM coding blocks. Although a PUCCH format 3 is exemplified as a UL channel in which channel-coded control information is transmitted, the present invention is not limited thereto. Thus, the present invention may also apply to a case where the PUCCH format 3 is modified. For example, the present invention may also apply to a modified PUCCH format 3 in which a spreading factor is decreased from the PUCCH format 3. In addition, optionally, the present invention may also apply to a case where UCI is transmitted through a PUSCH.

I. Distributed Arrangement Based on Priority Per UCI Type when Performing UCI Channel Coding-UCI Joint Coding.

RM coding is characterized in that decoding performance is good when coding is performed with a basis sequence having a low basis sequence index (BSI). In Table 4, a basis sequence having a lowest BSI is $M_{i,0}$, and a basis sequence having a highest BSI is $M_{i,10}$. Therefore, if an importance thereof is different according to a UCI type, UCI having a high importance is preferably arranged such that coding is performed by using a basis sequence having a low BSI. That is, preferably, multiplexing is performed by consecutively concatenating a bit stream order of RM coding in order of UCI having a high importance.

For example, when an importance is high in order of ACK/NACK, SR, and CSI among UCIs, an input bit of RM coding is arranged in a concatenated manner in order of ACK/NACK, SR, and CSI. If SR transmission is not required, it is arranged in order of ACK/NACK and CSI. In this case, RI, PTI, CQI, etc., additionally constructing the CSI may also have a different importance. In this case, the CSI may also construct the input bit of the RM coding in order of its importance.

An importance for each UCI type may correspond to an order of CSI, ACK/NACK, and SR, or an order of RI, ACK/NACK, SR, PTI, and CQI, or an order of RI, PTI, ACK/NACK, SR, and CQI. The importance for each UCI type may be determined by various criteria such as an influence exerted to a system throughput, an efficiency of UL control channel resource utilization, etc.

If a sum of payloads of UCI constituting the input bit stream of the RM coding exceeds 11 bits (i.e., if a UCI information bit exceeds 11 bits), double RM(dual RM) is used since a basis sequence is insufficient in case of single RM. In this case, a mechanism of segmenting concatenated UCI bit streams according to the aforementioned importance for each UCI is a matter.

Figure 15:
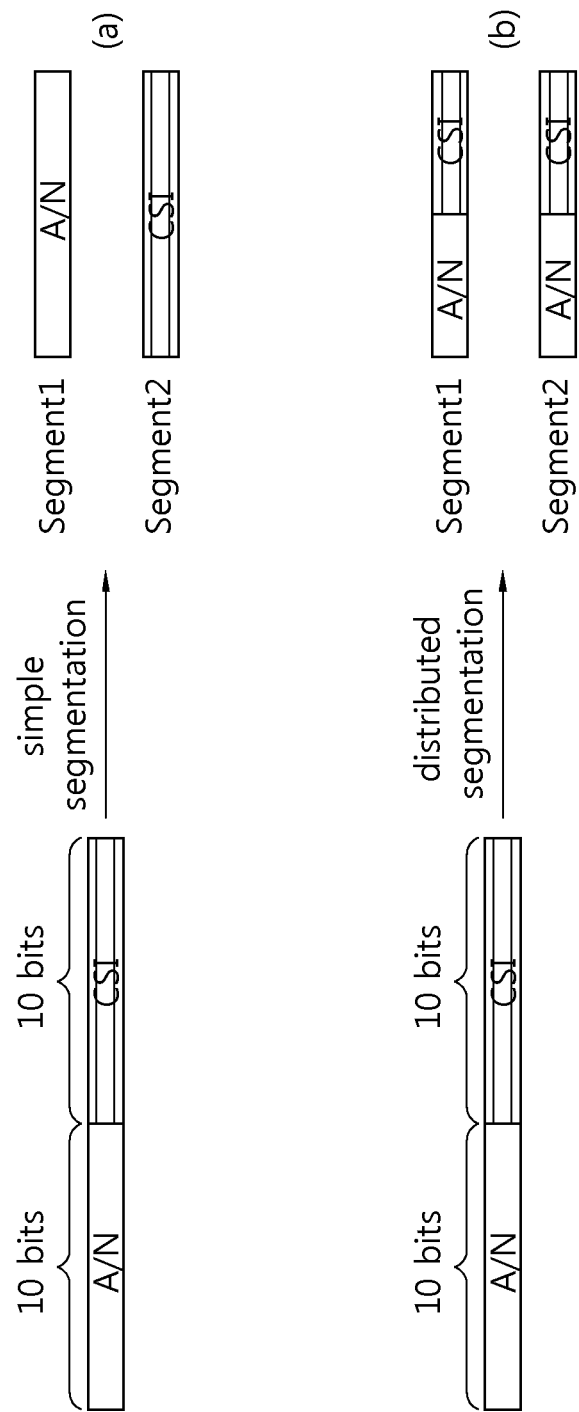
FIG. 15 shows an example of a method of segmenting a uplink control information (UCI) bit stream.

FIG. 15 shows an example of a method of segmenting a UCI bit stream.

Referring to FIG. 15(a), when a leftmost bit is a most significant bit (MSB), a UCI bit stream concatenated in order of ACK/NACK and CSI from the left is simple-segmented with the same number of bits for example. Each of a segment 1 and a segment 2 which are generated through the simple segmentation is RM-coded with a (32, A) RM code. As such, when the UCI bit stream is simple-segmented, there may be a case where UCI having a high importance is arranged to be coded with a basis sequence of an RM code having a higher BSI than UCI having a low importance. For example, even if ACK/NACK has a higher importance than CSI, when the ACK/NACK is simple-segmented to the segment 1 and the CSI is simple-segmented to the segment 2, there may be a case where right-side bits of the segment 1 are coded with a basis sequence of an RM code having a higher BSI than left-side bits of the segment 2.

In order to avoid this, as shown in FIG. 15(b), the present invention proposes to arrange UCI having a high importance (e.g., ACK/NACK bits) to a left side (i.e., an MSB side) of each of the segment 1 and the segment 2 in a distributed manner, and to arrange UCI having a low importance (e.g., CSI bits) of each segment subsequently in a distributed manner (this is called distributed segmentation or distributed mapping). Each of the segment 1 and the segment 2 which are generated through the distributed segmentation is RM-coded with a (32, A) RM code. When using such a distributed segmentation method, an ACK/NACK bit in each segment is coded with an RM basis sequence having a lower BSI. Therefore, decoding performance of a receiving side can be increased. The distributed segmentation can be implemented by introducing an interleaver before segmentation. The aforementioned concept will be described in a greater detail.

Figure 16:
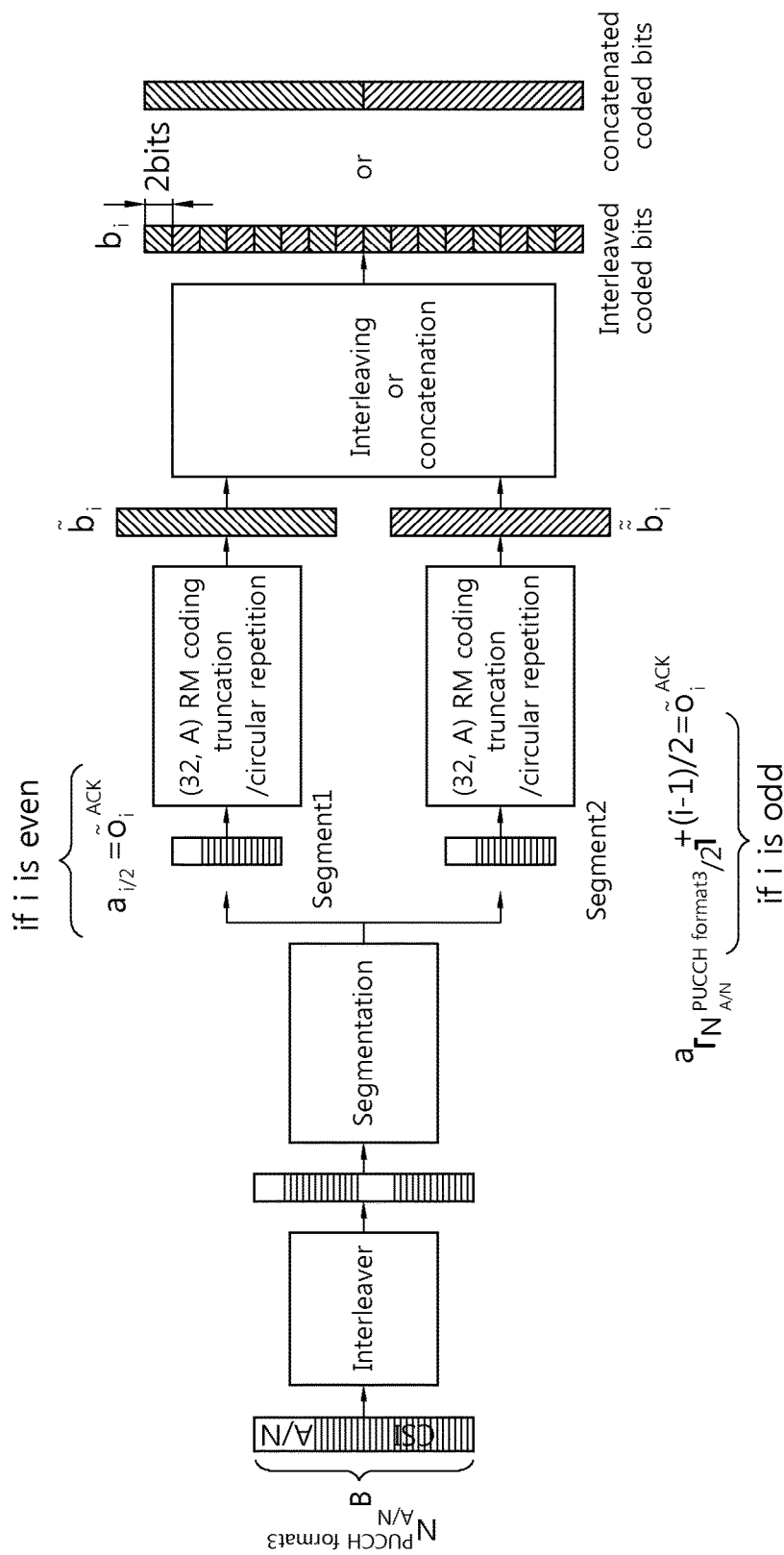
FIG. 16 shows a channel coding method using double RM according to an embodiment of the present invention.

FIG. 16 shows a channel coding method using double RM according to an embodiment of the present invention.

If a PUCCH format 3 is configured by a higher layer and is used to feed back ACK/NACK, the ACK/NACK to be fed back is configured with a concatenation of ACK/NACK bits of respective serving cells. 1-bit ACK/NACK information $a_k$ is used for one downlink subframe of a cell which is set to a single-codeword transmission mode. 2-bit ACK/NACK information $a_k$, $a_{k+1}$ is used for one downlink subframe of a cell which is set to another transmission mode, i.e., a multiple-codeword transmission mode, where $a_k$ corresponds to a codeword 0, and $a_{k+1}$ corresponds to a codeword 1. If spatial bundling is applied, the 1-bit ACK/NACK information may be used.

If the PUCCH format 3 is used for transmission of ACK/NACK feedback, $N^{PUCCHformat3}_{A/N}$ denotes the number of bits of ACK/NACK (SR may be included) and/or periodic CSI. In FIG. 16, a UCI bit stream consists of $N^{PUCCHformat3}_{A/N}$ bits. The UCI bit stream consisting of the $N^{PUCCHformat3}_{A/N}$ bits is aligned such as $a_0, a_1, a_2, \ldots, a_{N_{A/N}^{PUCCH\,format\,3}-1}$. Concatenated ACK/NACK bits, SR bits, and CSI bits may exist in $a_0, a_1, a_2, \ldots, a_{N_{A/N}^{PUCCH\,format\,3}-1}$. The concatenated ACK/NACK bits are obtained as follows.

In case of FDD, a bit sequence $a_0, a_1, a_2, \ldots, a_{N_{A/N}^{PUCCH\,format\,3}-1}$ may be a result of a concatenation of ACK/NACK bits for each of cells through a process of the following table. In the tables below, ACK/NACK is denoted by HARQ-ACK.

TABLE 5

1. Set c=0 - Cell index: Lower indices correspond to lower RRC incides of corresponding cell
2. Set j=0 - HARQ-ACK bit index
3. Set $N_{Cells}^{DL}$ as the number of cells assigned to UE by higher layer
  while c < $N_{Cells}^{DL}$
    if transmission mode which is set to Cell c is any one of {1,2,5,6,7}, 1-bit ACK/NACK is fed back for this cell
      $a_j$ = HARQ-ACK bit of this cell
      j = j + 1
    else
      $a_j$ = HARQ-ACK bit corresponding to first codeword
      j = j + 1
      $a_j$ = HARQ-ACK bit corresponding to second codeword
      j = j + 1
    end if
    c = c + 1
  end while ACK/NACK bits may be concatenated in order of ACK/NACK for a primary cell, i.e., a cell with c=0 and ACK/NACK for a secondary cell.

In case of TDD, a bit sequence $a_0, a_1, a_2, \ldots, a_{N_{A/N}^{PUCCH\,format\,3}-1}$ may be acquired by the following table for each of cells and for each of subframes. In the table below, $N^{DL}_{cells}$ denotes the number of cells assigned to a UE by a higher layer, and $B^{DL}_c$ denotes the number of DL subframes in which ACK/NACK must be fed back in a cell c by the UE. The number of ACK/NACK bits to be delivered by the UE is calculated by the following table.

TABLE 6

1. Set k=0 - Counter of HARQ-ACK bits
2. Set c=0 - Cell index: Lower indices correspond to lower RRC incides of corresponding cell
3. while c < $N_{Cells}^{DL}$
set l = 0;
  while l < $B_c^{DL}$
    if transmission mode which is set to Cell c is any one of {1,2,5,6,7}, 1-bit ACK/NACK is fed back for this cell
      k = k + 1
    else
      k = k + 2
    end if
    c = c + 1
  end while If k≤20, HARQ-ACK bits are multiplexed by the following table.

TABLE 7

1. Set c=0 - Cell index: Lower indices correspond to lower RRC incides of corresponding cell TABLE 7-continued 2. Set j=0 - HARQ-ACK bit index
3. while c < $N_{Cells}^{DL}$
  set l = 0;
  while l < $B_c^{DL}$
    if transmission mode which is set to Cell c is any one of {1,2,5,6,7}, 1-bit ACK/NACK is fed back for this cell
      $\tilde{o}_j^{ACK} = o_{c,l}^{ACK}$ HARQ-ACK bit of this cell
      j = j + 1
    else
      $[\tilde{o}_j^{ACK}, \tilde{o}_{j+1}^{ACK}] = [o_{c,2l}^{ACK}, o_{c,2l+1}^{ACK}]$ HARQ-ACK bit of this cell
      j = j + 2
    end if
    l=l+1
  end while
  c = c + 1
end while If k>20, spatial bundling is applied to all subframes of all cells. In addition, HARQ-ACK bits are multiplexed by the following table.

TABLE 8

1. Set c=0 - Cell index: Lower indices correspond to lower RRC incides of corresponding cell
2. Set j=0 - HARQ-ACK bit index
3. while c < $N_{Cells}^{DL}$
  set l = 0;
  while l < $B_c^{DL}$
    if transmission mode which is set to Cell c is any one of {1,2,5,6,7}, 1-bit ACK/NACK is fed back for this cell
      $\tilde{o}_j^{ACK} = o_{c,l}^{ACK}$ HARQ-ACK bit of this cell
      j = j + 1
    else
      $\tilde{o}_j^{ACK} = o_{c,l}^{ACK}$ Binary AND operation of HARQ ACK bits corresponding to first codeword and second codeword of this cell
      j = j + 1
    end if
    l=l+1
  end while
  c = c + 1
end while If the PUCCH format 3 is used for ACK/NACK feedback and SR transmission is set in a subframe in which the ACK/NACK feedback is performed, one bit for an SR (if 1, a positive SR, and if 0, a negative SR) is additionally concatenated at the end of ACK/NACK bits of the concatenated bit.

If the PUCCH format 3 is used for ACK/NACK feedback and periodic CSI transmission is assigned by a higher layer in a subframe for performing the ACK/NACK feedback, periodic CSI bits are additionally concatenated at the end of concatenated ACK/NACK bits (if an SR bit is added, after the SR bit). If the SR and the period CSI are concatenated at the end of the concatenated ACK/NACK bits, in the aforementioned process, $N^{PUCCHformat3}_{A/N}$ is a value indicating a sum of the number of bits of the concatenated ACK/NACK bits and the number of bits of the SR and the periodic CSI.

If $N^{PUCCHformat3}_{A/N}$ is less than or equal to 11 bits, the bit sequence $a_0, a_1, a_2, \ldots, a_{N_{A/N}^{PUCCH\,format\,3}-1}$ is obtained by setting to $a_i = \tilde{o}_i^{ACK}$.

If $N^{PUCCHformat3}_{A/N}$ is less than or equal to 11 bits, the bit sequence $a_0, a_1, a_2, \ldots, a_{N_{A/N}^{PUCCH\,format\,3}-1}$ is encoded by the following equation.

$$\tilde{b}_i = \sum_{n=0}^{N_{A/N}^{PUCCH\,format\,3}-1} (a_n \cdot M_{i,n}) \bmod 2$$

[Equation 2]

Herein, i is 0, 1, 2, . . . , 31, and basis sequences $M_{i,n}$ are defined by Table 4.

An output bit sequence $b_0, b_1, b_2, \ldots, b_{B-1}$ is obtained by the following equation through circular repetition of a sequence $\tilde{b}_0, \tilde{b}_1, \tilde{b}_2, \ldots, \tilde{b}_{31}$.

$$b_i = \tilde{b}_{(i \bmod 32)}$$

[Equation 3]

Herein, i=0, 1, 2, . . . , B−1, where $B=4N_{sc}^{RB}$. $N_{sc}^{RB}$ denotes a resource block size in a frequency domain expressed with the number of subcarriers.

If $N_{A/N}^{PUCCH format3}$ is greater than 11 bits and less than or equal to 22 bits, the bit sequence $a_0, a_1, a_2, \ldots, a_{N_{A/N}^{PUCCH\,format\,3}-1}$ is obtained by the following equation.

$$a_{i/2} = \tilde{o}_i^{ACK}, \text{ i is an even number}$$

[Equation 4]

$$a[N_{A/N}^{PUCCH\,format3}/2]_{+(i-1)/2} = \tilde{o}_i^{ACK}, \text{ i is an odd number}$$

[Equation 4]

That is, Equation 4 above corresponds to a process of interleaving a UCI bit stream in FIG. 16. According to Equation 4, concatenated ACK/NACK bits arranged to a front portion are arranged in a distributed manner in a UCI bit stream consisting of $N_{A/N}^{PUCCHformat3}$ bits. If a bit sequence $a_0, a_1, a_2, \ldots, a_{[N_{A/N}^{PUCCH\,format\,3}/2]-1}$ is a segment 1 and a bit sequence $a_{[N_{A/N}^{PUCCH\,format\,3}/2]}, a_{[N_{A/N}^{PUCCH\,format\,3}/2]+1}, a_{[N_{A/N}^{PUCCH\,format\,3}/2]+2}, \ldots, a_{N_{A/N}^{PUCCH\,format\,3}-1}$ is a segment 2, a bit stream (i.e., $a_0, a_1, a_2, \ldots, a_{N_{A/N}^{PUCCH\,format\,3}-1}$) obtained by interleaving the UCI bit stream by using Equation 4 is a bit stream in which the segment 1 and the segment 2 are concatenated in that order, ACK/NACK is arranged to an MSB side of each of the segments 1 and 2, and periodic CSI is arranged in an LBS side. More specifically, according to Equation 4, bits of which a bit index i is an even number in the UCI bit stream are arranged in the 1st segment in an orderly manner, and bits of which a bit index is an odd number in the UCI bit stream are arranged in the 2nd segment in an orderly manner. Since a bit stream interleaved in this manner is greater than 11 bits and less than or equal to 22 bits, it is segmented into the segment 1 and the segment 2 to perform double RM, and thus double RM coding is performed by the following equation.

$$\tilde{b}_i = \sum_{n=0}^{[N_{A/N}^{PUCCH\,format\,3}/2]-1} (a_n \cdot M_{i,n}) \bmod 2$$

[Equation 5]

$$\tilde{\tilde{b}}_i = \sum_{n=0}^{N_{A/N}^{PUCCH\,format\,3}-[N_{A/N}^{PUCCH\,format\,3}/2]-1} (a_{[N_{A/N}^{PUCCH\,format\,3}/2]+n} \cdot M_{i,n}) \bmod 2$$

Herein, i=0, 1, 2, . . . , 23, and basis sequences $M_{i,n}$ are defined by Table 4.

As shown in Equation 5 above, according to the present invention, ACK/NACK bits of the segments 1 and 2 are coded with a basis sequence of an RM code having a lower BSI, and periodic CSI is coded with a basis sequence of an RM code having a relatively higher BSI. Therefore, even if multiple ACK/NACK and periodic CSI are transmitted together, a decoding performance of ACK/NACK having a high importance can be guaranteed.

A bit sequence $b_0, b_1, b_2, \ldots, b_{B-1}$ is obtained by cross-concatenating bit sequences $\tilde{b}_0, \tilde{b}_1, \tilde{b}_2, \ldots, \tilde{b}_{23}$ and $\tilde{\tilde{b}}_0, \tilde{\tilde{b}}_1, \tilde{\tilde{b}}_2, \ldots, \tilde{\tilde{b}}_{23}$ by 2 bits as shown in the following table. That is, when a channel-coded UCI is interleaved, the interleaving can be expressed such that 2 bits obtained from each of bits of the 1st and 2nd segments which are channel-coded are concatenated alternately as shown in Table 9 below. Herein, $B=4 N_{sc}^{RB}$.

TABLE 9

Figure 17:
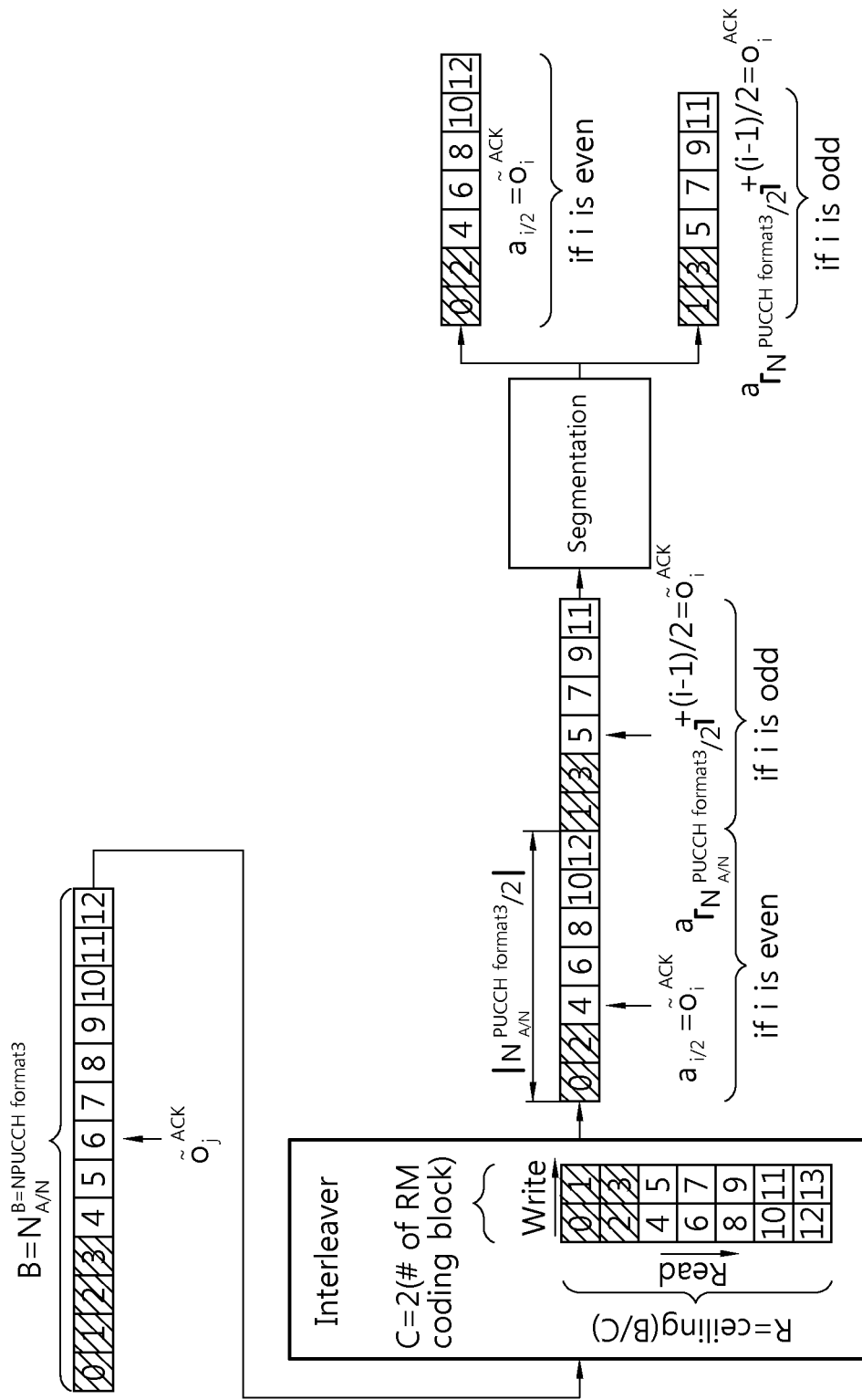
FIG. 17 shows an interleaver of FIG. 16 in detail.

Set i, j = 0
while i < 4·$N_{sc}^{RB}$
  $b_i = \tilde{b}_j$, $b_{i+1} = \tilde{\tilde{b}}_{j+1}$
  $b_{i+2} = \tilde{b}_j$, $b_{i+3} = \tilde{\tilde{b}}_{j+1}$
  i = i + 4
  j = j + 2
end while FIG. 17 shows the interleaver of FIG. 16 in detail.

As to B bit streams, the interleaver writes a column preferentially (i.e., a mechanism of moving to a next row index after increasing a column index), and reads a row preferentially (i.e., a mechanism of moving to a next column index after increasing a row index). When the number of columns of the interleaver is C, C=2 in case of double RM. If two or more RM coding blocks are used, C is the number of RM coding blocks.

As shown in FIG. 17, a UCI bit stream consisting of $B(=N_{A/N}^{PUCCHformat3})$ bits is subjected to interleaving so that bits having an even-numbered bit index are aligned in an MSB side, and bits having an odd-numbered bit index are aligned in an LSB side. An interleaved bit stream $a_0, a_1, a_2, \ldots, a_{N_{A/N}^{PUCCH\,format\,3}-1}$ may be segmented into a segment consisting of only bits having an even-numbered bit index and a segment consisting of only bits having an odd-numbered bit index in the UCI bit stream. Alternatively, interleaving and segmenting may be performed simultaneously.

Figure 18:
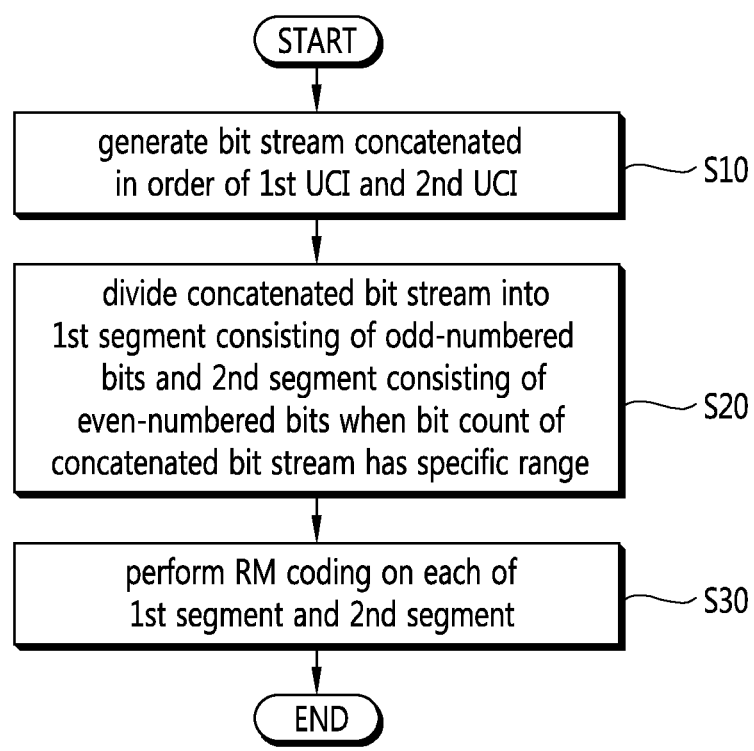
FIG. 18 is a flowchart of a method described with reference to FIG. 16 and FIG. 17.

FIG. 18 is a flowchart of the method described with reference to FIG. 16 and FIG. 17.

Referring to FIG. 18, a UE generates a concatenated bit stream in order of 1st UCI and 2nd UCI (step S10). If the number of bits of the concatenated bit stream has a specific range, the UE segments the concatenated bit stream after interleaving in order of a 1st segment consisting of odd-numbered bits (if a bit index of an MSB is 0 and is sequentially increased in the concatenated bit stream, the odd-numbered bits are bits of which a bit index is an even number) and a 2nd segment consisting of even-numbered bits (if a bit index of an MSB is 0 and is sequentially increased in the concatenated bit stream, the even-numbered bits are bits of which a bit index is an odd number) (step S20), and performs RM coding on the 1st segment and the 2nd segment (step S30). Such a method can be applied to channel coding and multiplexing of ACK/NACK and periodic CSI if a PUCCH format 3 is used for ACK/NACK feedback and periodic CSI transmission is scheduled in a subframe for performing the ACK/NACK feedback (SR may also be included). Accordingly, as shown in FIG. 16, ACK/NACK and CSI are uniformly distributed to RM coding blocks in both sides. In each RM coding, coding is achieved such that the ACK/NACK is coded with a basis sequence of an RM code having a low BSI, and the CSI is coded with a basis sequence of an RM code having a high BSI.

Meanwhile, in case of ACK/NACK, additional channel coding may be performed to satisfy an error rate required per information. That is, $1^{st}$ channel coding may be first performed on the ACK/NACK, and $2^{nd}$ channel coding may be performed together with other UCIs. For example, after performing repetition coding in case of a 1-bit indicator per CC and performing simplex coding in case of a 2-bit indicator per CC, joint coding may be performed together with other UCIs.

II. Method of Securing ACK/NACK Transmission Resource in UCI Joint Coding.

Periodic CSI is reported according to a period configured by a higher layer signal between a BS and a UE. Therefore, there is no ambiguity between the BS and the UE as to a presence/absence of CSI. On the other hand, in case of ACK/NACK, there is a possibility that the UE cannot receive scheduling information for scheduling a PDSCH. In this case, although the BS expects ACK/NACK for the PDSCH in a UL subframe in which the ACK/NACK is transmitted, since the UE fails to receive the scheduling information itself, an erroneous situation may occur in which the ACK/NACK is not transmitted at all. When the ACK/NACK and the CSI are transmitted through multiplexing, if transmission is performed by using the same format (e.g., PUCCH format 3) and the same resource as those used in case of transmitting only the CSI, in the aforementioned erroneous situation, ambiguity may occur for the BS as to whether UCI is ACK/NACK+CSI or includes only the CSI.

That is, in case of UCI information having no ambiguity in its presence/absence, whether a bit field position for corresponding UCI information exists can be determined according to the presence/absence. However, in case of UCI having ambiguity in its presence/absence, as one method of decreasing an error, a bit field for the UCI information is secured irrespective of the presence/absence of the UCI information.

For example, in a UL subframe in which the UE does not transmit periodic CSI, there is no error even if ACK/NACK is transmitted by using all resources in a PUCCH format assigned to the UE. This is because there is no ambiguity between the BS and the UE as to a presence/absence of the periodic CSI. On the other hand, if CSI is transmitted in a UL subframe in which ACK/NACK is not transmitted, even if there is no ACK/NACK to be transmitted, CSI is mapped to the remaining resources other than a resource to be mapped with maximum ACK/NACK information that can be generated in a corresponding configuration.

Figure 19:
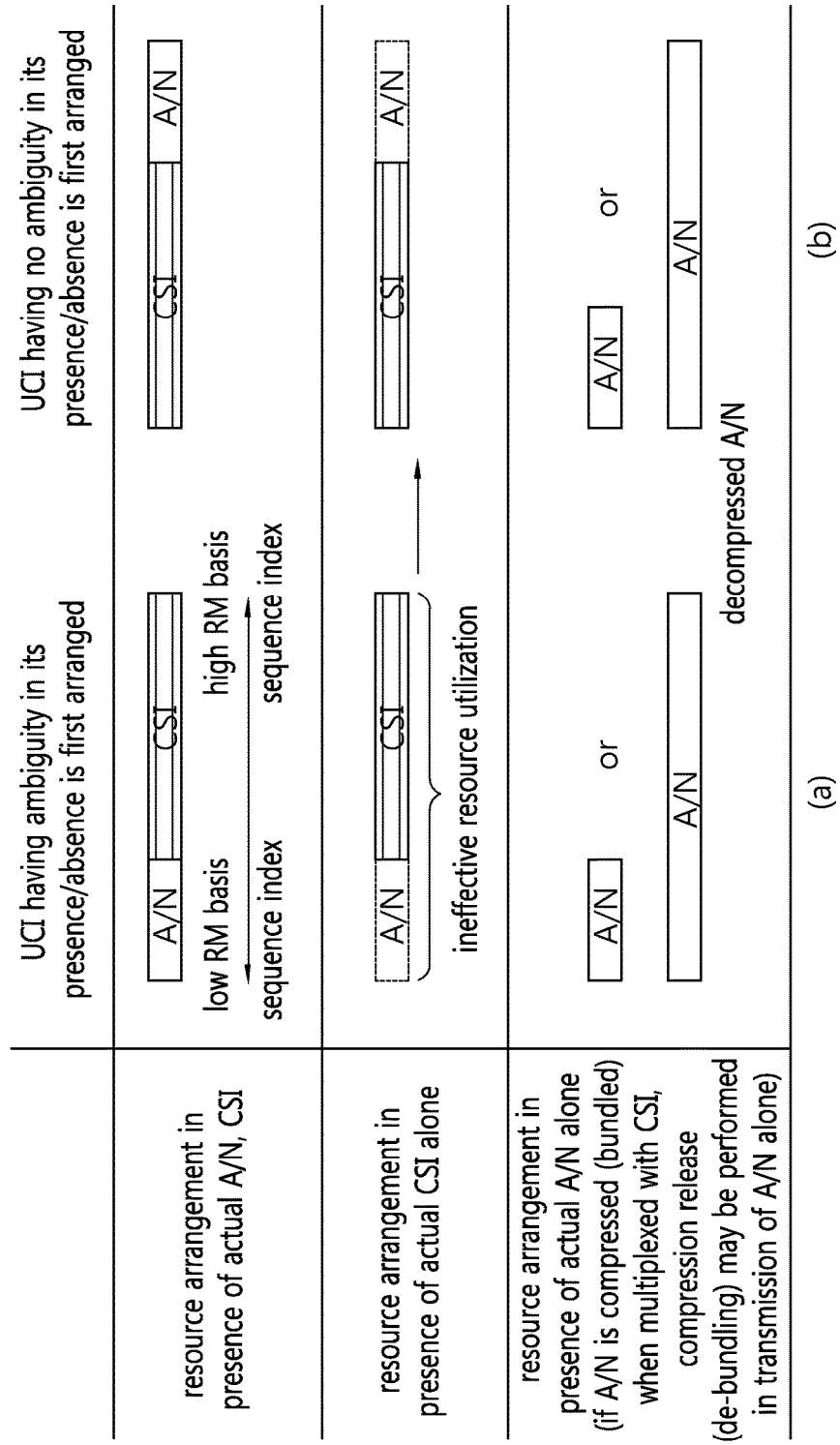
FIG. 19 shows an example of a resource arrangement when ACK/NACK and CSI are transmitted through multiplexing.

FIG. 19 shows an example of a resource arrangement when ACK/NACK and CSI are transmitted through multiplexing.

Referring to FIG. 19(a), when the ACK/NACK and the CSI are present and are transmitted through multiplexing, concatenating is achieved in order of the ACK/NACK and the CSI, the ACK/NACK is coded with an RM basis sequence having a low BSI, and the CSI is coded with an RM basis sequence having a high BSI. If the ACK/NACK is not present and only the CSI is present, CSI bits are arranged in a state where a bit field of the ACK/NACK is empty. Therefore, since a resource efficiency is decreased, and CSIs cannot be coded with the RM basis sequence having a low BSI, there may be a problem in which a decoding performance deteriorates. In addition, if only the ACK/NACK is present, the ACK/NACK is arranged to an ACK/NACK bit field or an entire bit field.

As one method of solving the aforementioned problem, as shown in FIG. 19(b), UCI having no ambiguity in a presence/absence, e.g., CSI, may be arranged first, followed by UCI having ambiguity, e.g., ACK/NACK. In this case, when only the CSI is present, the CSI is coded by using an RM basis sequence having a low BSI, and thus there is an advantage in that a decoding performance is increased.

In case of SR, a subframe in which the SR can be transmitted is configured similarly to the CSI, and thus there is no ambiguity in a presence/absence of an SR bit. Therefore, it is possible to conform to the aforementioned rule. For example, when the SR and the ACK/NACK are transmitted simultaneously, the SR is arranged first, and the ACK/NACK is arranged later. When the SR and the CSI are transmitted simultaneously, both of them do not have ambiguity, and thus any one of an order of SR and CSI or an order of CSI and SR can be used. When the SR, the CSI, and the ACK/NACK are transmitted simultaneously, they are arranged in order of the CSI, the SR, and the ACK/NACK or in order of the SR, the CSI, and the ACK/NACK.

Meanwhile, for backward compatibility with the legacy system, even if the SR is UCI not having ambiguity, the SR may be exceptionally arranged next to the ACK/NACK. Therefore, when the SR and the ACK/NACK are transmitted simultaneously, they may be arranged in order of the ACK/NACK and the SR. When the SR and the CSI are transmitted simultaneously, they may be arranged in order of the CSI and the SR. When the SR, the CSI, and the ACK/NACK are transmitted simultaneously, they may be arranged in order of the CSI, the ACK/NACK, and the SR.

III. Classification of Transmission Resource Based on UCI Transmission Combination.

As described above, if the same format (e.g., the PUCCH format 3) and the same resource are used in a case where ACK/NACK (SR may also be included) and CSI are transmitted through multiplexing and a case where only the CSI is transmitted, ambiguity may occur according to a presence/absence of the ACK/NACK. In order to solve such ambiguity, a method of first arranging UCI having no ambiguity in its presence/absence as described above has a problem in that a coding scheme must be determined by securing a resource for UCI not transmitted in practice, and a result may occur in which information such as CSI having no ambiguity but having less importance is coded with an RM basis sequence having a low BSI.

Therefore, the present invention proposes a method for performing transmission using different formats for a case of transmitting ACK/NACK and CSI through multiplexing and a case of transmitting only the CSI, or even if the same format is used, for performing transmission by allocating resources distinguished mutually exclusively.

For example, when a UL subframe in which a UE transmits CSI is a subframe n, in a DL subframe (i.e., subframe n-k) corresponding to the subframe n, the following is achieved.

i) When a DL channel which requires an ACK/NACK response cannot be detected and thus only the CSI is transmitted in the UL subframe, UCI consisting of only the CSI is configured and a $1^{st}$ resource is used.

ii) When the DL channel which requires the ACK/NACK response is detected and thus the ACK/NACK and the CSI are transmitted together through multiplexing in the UL subframe, UCI consisting of ACK/NACK+CSI is configured and a $2^{nd}$ resource is used.

The following description is about the $1^{st}$ resource and the $2^{nd}$ resource.

Figure 20:
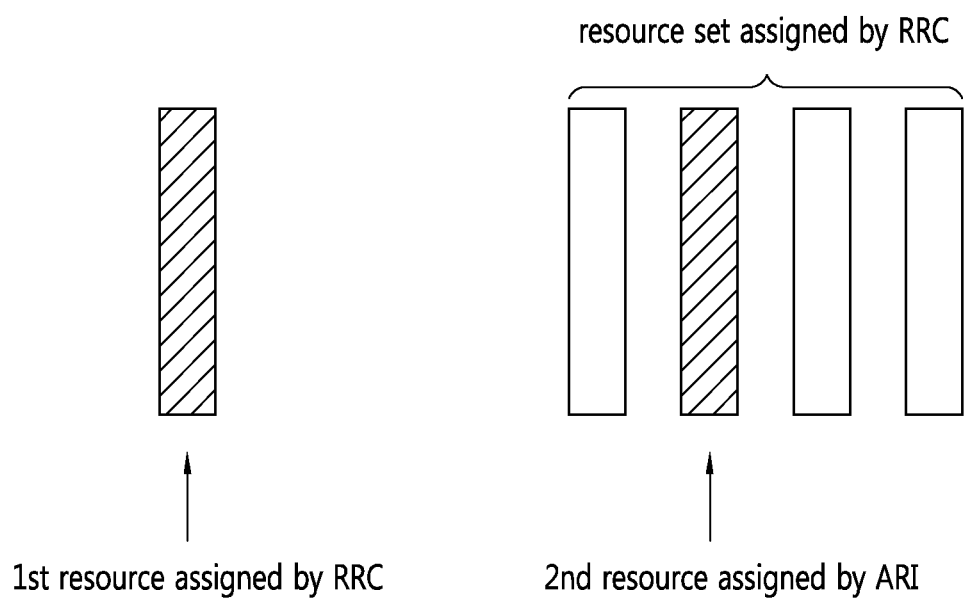
FIG. 20 is an example of a 1st resource and a 2nd resource.

FIG. 20 is an example of a $1^{st}$ resource and a $2^{nd}$ resource.

The $1^{st}$ resource and the $2^{nd}$ resource imply resources or formats distinguished in a mutually exclusive manner.

The $1^{st}$ resource may use one fixed resource pre-assigned by RRC. In addition, the $2^{nd}$ resource may be used by selecting one resource, which is indicated by an ARI, from a plurality of resource (e.g., 4 resources) pre-assigned by RRC, that is, from a resource set. The ARI is transmitted through a DL channel which requires ACK/NACK, e.g., an SPS release PDCCH or a control channel (PDCCH) for scheduling a PDSCH which requires ACK/NACK.

Figure 21:
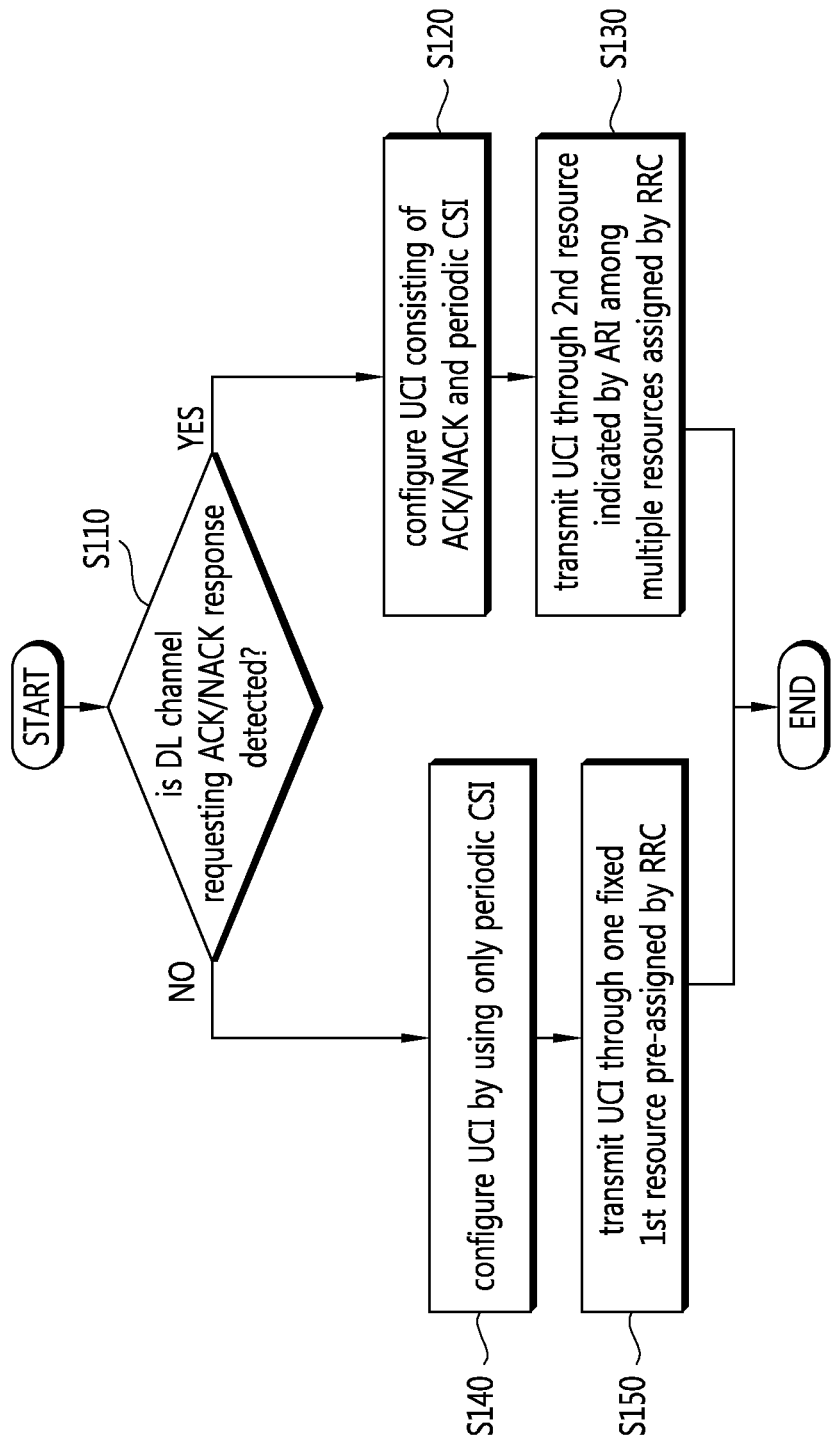
FIG. 21 shows an example of a resource selection method when ACK/NACK and CSI can be transmitted through multiplexing by using the same format.

FIG. 21 shows an example of a resource selection method when ACK/NACK and CSI can be transmitted through multiplexing by using the same format.

As to a UL subframe for transmitting periodic CSI, a UE determines whether a DL channel which requests an ACK/NACK response is detected in a DL subframe corresponding to the UL subframe (step S110).

If the DL channel is not detected, the UE configures UCI by using only the periodic CSI (step S140), and transmits the UCI through one fixed $1^{st}$ resource pre-assigned by RRC (step S150). On the other hand, if the DL channel is detected, the UE configures UCI consisting of periodic CSI and ACK/NACK for the DL channel (step S120), and transmits the UCI through a $2^{nd}$ resource indicated by an ARI among a plurality of resources assigned by RRC.

In FIG. 21, the $1^{st}$ resource or the $2^{nd}$ resource is selected according to whether the DL channel is detected. More specifically, the $1^{st}$ resource or the $2^{nd}$ resource may be selected according to whether the UE receives the ARI in the DL channel. For example, a PUCCH format 3 is set to the UE for ACK/NACK transmission, and a UL subframe in which ACK/NACK transmission is set together with periodic CSI is assumed. If the PUCCH format 3 resource (i.e., $2^{nd}$ resource) is indicated by an ARI in a DL channel which requests ACK/NACK or a PDCCH for scheduling this, the UE multiplexes ACK/NACK (SR may be included) and periodic CSI for one cell by joint-coding them up to 22 bits, and transmits them through the PUCCH format 3 resource (i.e., $2^{nd}$ resource) indicated by the ARI. On the other hand, if the ARI is not present, UCI consisting of only periodic CSI is transmitted through the $1^{st}$ resource pre-assigned by RRC.

That is, when the method of FIG. 21 is used, the UE may operate as follows. The UE receives a data unit which requests an ACK/NACK response in a downlink subframe. Herein, the data unit may be a codeword transmitted through a physical downlink shared channel (PDSCH) of the downlink subframe or a PDCCH or the like transmitted in the downlink subframe. The PDCCH may be a PDCCH indicating a release of semi-persistent scheduling (SPS). The UE transmits ACK/NACK for the data unit in an uplink subframe. If the uplink subframe is configured to transmit periodic channel state information (CSI), the periodic CSI and the ACK/NACK are transmitted through a physical uplink control channel (PUCCH) of the uplink subframe. The ACK/NACK and the periodic CSI may be transmitted through joint-coding. In this case, if an ACK/NACK resource indicator (ARI) is included in the downlink subframe, a resource for transmitting the PUCCH may be a plurality of resources pre-assigned by a higher layer signal such as RRC, that is, one resource indicated by the ARI in a resource set. The ARI may be included in downlink control information (DCI) transmitted through a physical downlink control channel (PDCCH) of the downlink subframe.

UL subframes in which periodic CSI can be transmitted may be predetermined by a higher layer signal.

In addition, a PUCCH format in which the ACK/NACK is transmitted may be a PUCCH format pre-assigned by a higher layer signal as one of a plurality of PUCCH formats, for example, the aforementioned PUCCH format 3. The PUCCH format 3 is a PUCCH format capable of transmitting information bit of up to 22 bits.

In addition, if a PUCCH resource used when only periodic CSI is transmitted in the uplink subframe is a $1^{st}$ resource and one resource indicated by the ARI is a $2^{nd}$ resource, the $1^{st}$ resource and the $2^{nd}$ resource are resources distinguished in a mutually exclusive manner as described above with reference to FIG. 20.

According to the aforementioned method, since mutually distinguished resources are used in a case of transmitting the ACK/NACK and the periodic CSI together and a case of transmitting only the periodic CSI, ambiguity does not occur from a perspective of a BS. Therefore, UCI can be transmitted in a reliable and effective manner. Meanwhile, in a method of allocating the $1^{st}$ resource and the $2^{nd}$ resource, according to a CC which is a target of ACK/NACK and/or the number of ACK/NACK bits or according to whether an ARI is obtained, the following resource allocation method can be configured.

1) When ACK/NACK for a 'combination of $1^{st}$ ACK/NACK targets' (called 'ACK/NACK combination 1') and CSI must be transmitted together or when only the CSI is transmitted without an ACK/NACK transmission target, a $1^{st}$ resource is used by configuring UCI consisting of the ACK/NACK combination 1 and the CSI.

2) When ACK/NACK for a 'combination of $2^{nd}$ ACK/NACK targets' (called 'ACK/NACK combination 2') and CSI must be transmitted together, a $2^{nd}$ resource is used by configuring UCI consisting of the ACK/NACK combination 2 and the CSI.

Figure 22:
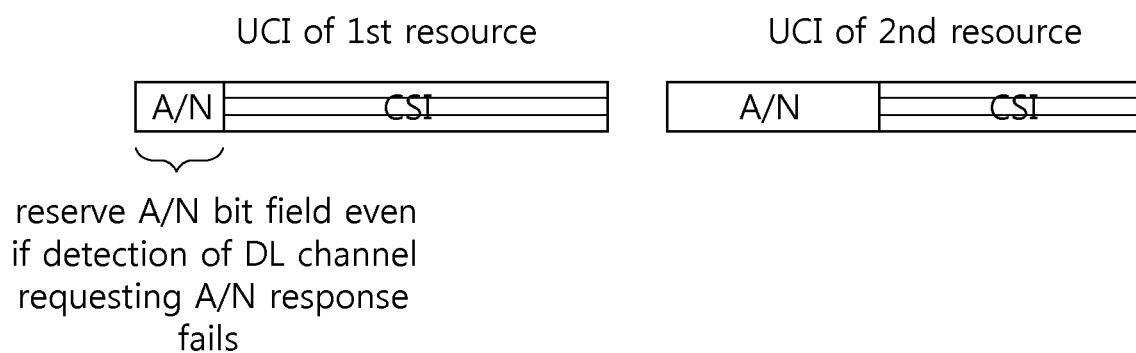
FIG. 22 shows an example of a UCI configuration in a 1st resource and a 2nd resource.

FIG. 22 shows an example of a UCI configuration in a $1^{st}$ resource and a $2^{nd}$ resource.

Referring to FIG. 22, the $2^{nd}$ resource is a case where ACK/NACK and periodic CSI are transmitted together, and the ACK/NACK and the periodic CSI are arranged. The $1^{st}$ resource secures a resource for an ACK/NACK combination 1 even if a combination of the $1^{st}$ ACK/NACK target cannot be detected and thus only CSI is generated. This is to prepare a situation in which ambiguity occurs between a BS and a UE when the BS transmits a DL channel which requires an ACK/NACK response but the UE fails to detect to this. This method is similar to a method of securing an ACK/NACK resource always irrespective of whether an actual ACK/NACK response target channel is detected, but has an advantage in that a resource waste can be decreased in a sense that the ACK/NACK combination 1 secures only an ACK/NACK resource for basic communication between the BS and the UE.

For example, in case of FDD, if a DL transmission mode of a PCC is a single-codeword transmission mode, one bit may be secured, and if the DL transmission of the PCC is a multi-codeword transmission mode, two bits may be secured, so as to be used in case of PCC scheduling. In case of TDD, one bit (single-codeword transmission mode) or two bits (multi-codeword transmission mode) may be used as an ACK/NACK response for one channel transmitted through the PCC in one UL subframe, or transmission may be performed by securing two bits as an ACK/NACK resource for a plurality of channels transmitted through the PCC. In addition, in an SR subframe, an SR bit field may also be included in the 'ACK/NACK combination 1'.

In a bit ACK/NACK position, an ACK/NACK bundling (e.g., spatial bundling and/or a logical AND operation, a consecutive ACK counter, etc.) scheme may be applied for compression transmission.

In case of TDD, by considering a case where an ACK/NACK for "'PDCCH (e.g., SPS release) with downlink assignment index (DAI)=1 and requesting an ACK/NACK response' or 'DAI=1 of the PDCCH when a PDSCH scheduled with a PDCCH exists only one in a PCC'" is generated simultaneously with an ACK/NACK for an "(SPS) PDSCH scheduled without a PDCCH", transmission may be performed by securing two bits or more to transmit each ACK/NACK. For example, in the multi-codeword transmission mode, three bits may be secured so that a first bit is used as a PDSCH scheduled without a PDCCH and the remaining two bits are used as 'PDSCH with DAI=1' or ACK/NACK for an SPS release PDCCH with DAI=1. In the single-codeword transmission mode, two bits may be secured so that one bit is used as a 'PDSCH scheduled without a PDCCH' and the remaining one bit is used as a PDSCH with DAI=1 or ACK/NACK for an SPS release PDCCH with DAI=1.

An ACK/NACK bit may be mapped to a bit order predetermined according to a condition of an ACK/NACK target as described in the above example. For example, an ACK/NACK bit for the 'PDSCH scheduled with the PDCCH' is mapped from an MSB side of the 'ACK/NACK combination 1', and if an ACK/NACK bit for the 'PDSCH scheduled without the PDCCH' is included, is mapped to an LSB side of the 'ACK/NACK combination 1'. In addition, in an SR subframe, if an SR bit field is included in the 'ACK/NACK combination 1', it may be mapped to an LSB of the 'ACK/NACK combination 1'.

In particular, in the above description, if the $1^{st}$ resource and the $2^{nd}$ resource use the same PUCCH format (e.g., PUCCH format 3) in transmission, a resource of the 'ACK/NACK combination 1' may be secured for the $1^{st}$ resource.

Meanwhile, the number of ACK/NACK bits of the ACK/NACK combination 2 is the maximum number of ACK/NACK bits that can be generated in a UL subframe and is determined according to the number of DL CCs assigned to the UE and a transmission mode of each DL CC, and in case of TDD, is determined by additionally considering the number of DL subframes corresponding to one UL subframe.

The $1^{st}$ ACK/NACK target combination and the $2^{nd}$ ACK/NACK target combination may be determined as follows.

A target of ACK/NACK which cannot obtain an ARI since ACK/NACK transmission is required and a PDCCH including the ARI does not exist is a $1^{st}$ ACK/NACK target combination. A target of ACK/NACK which requires ACK/NACK transmission and which can obtain the ARI since the PDCCH including the ARI exists is a $2^{nd}$ ACK/NACK target combination.

A resource allocation method based on an ACK/NACK target CC and/or the number of ACK/NACK bits is as follows.

If it is configured to use a PUCCH format 3 for ACK/NACK transmission for multiple CCs in FDD or if it is configured to use channel selection of PUCCH formats 1a/1b for ACK/NACK transmission for multiple CCs, ACK/NACK transmission is required in a UL subframe for transmitting CSI, and if the following cases are satisfied in a DL subframe corresponding to the UL subframe, it is the $1^{st}$ ACK/NACK target combination.

i) When one PDSCH exists only in a PCC and is scheduled without a PDCCH.

ii) When one PDSCH exists only in the PCC and is scheduled through the PDCCH.

iii) When one PDCCH exists only in the PCC and the PDCCH requires an ACK/NACK response.

In other cases, it is the $2^{nd}$ ACK/NACK target combination.

If it is configured to use a PUCCH format 3 for ACK/NACK transmission for multiple CCs in TDD or if it is configured to select a PUCCH format 1a/1b channel for ACK/NACK transmission for multiple CCs, a UL subframe (i.e., subframe n) for transmitting CSI for a DL CC requires ACK/NACK transmission, and the following cases may exist in a DL subframe (i.e., subframe n-k, where k is an element of a set K, and K is a set consisting of M elements and defined by 3GPP TS 36.213 V10, Evolved Universal Terrestrial Radio Access (E-UTRA); Physical layer procedures (Release 10) table 10.1.3.1-3) corresponding to this UL subframe.

i) When there is only one PDSCH scheduled without a PDCCH in a PCC alone and there is no PDCCH which requires an ACK/NACK response.

ii) When there is only one PDSCH scheduled with a PDCCH in a PCC alone and there is a PDCCH with DAI=1.

iii) When there is only one PDCCH with DAI=1 which requires an ACK/NACK response and there is no PDSCH.

iv) When there is a PDCCH with DAI=1 which requires an ACK/NACK response or there is only one PDSCH scheduled with a PDCCH in a PCC alone and there is only one PDSCH with DAI−1 of the PDCCH and scheduled without a PDCCH at the same time.

In the above cases i to iv), it is the $1^{st}$ ACK/NACK target combination.

In other cases, it is the $2^{nd}$ ACK/NACK target combination.

If it is configured to select a PUCCH format 1a/1b channel for ACK/NACK transmission for multiple CCs in TDD, a UL subframe (i.e., subframe n) which transmits CSI for a DL CC requires ACK/NACK transmission. If a PDSCH or a PDCCH which requires an ACK/NACK response is received only in a PCC in a DL subframe (i.e., subframe n-k) corresponding to this UL subframe, it is the $1^{st}$ ACK/NACK target combination, and otherwise, it is the $2^{nd}$ ACK/NACK target combination.

IV. Method of Indicating CSI Transmission Resource.

Periodic CSI transmission is achieved according to a period configured in advance by RRC, and does not have a related PDCCH. Therefore, a location of a resource for CSI transmission is predetermined.

Meanwhile, in ACK/NACK transmission, a PDCCH for scheduling a PDSCH exists, and an ACK/NACK resource indicator (ARI) included in the PDCCH is used to indicate a location of an ACK/NACK transmission resource. Since an ARI bit is limited, a resource that can be indicated is limited. Therefore, a resource set is assigned in advance by RRC, and an ARI in the resource set is used to indicate a specific resource. For example, since four resources can be indicated if the ARI bit is 2 bits, a resource set including the four resources can be assigned by RRC, and the ARI can be used to indicate any one of the four resources.

If a CSI resource and an ACK/NACK resource are assigned independently, five resources are assigned by RRC. If the CSI resource and the ACK/NACK resource have the same format, in order to decrease an unnecessary resource assignment, the CSI resource can be used as one of ACK/NACK resource sets designated by RRC. That is, a resource set for ACK/NACK may be assigned by RRC, and thereafter a resource for CSI may be indicated by using an ARI, or the resource for CSI may use a resource of a predetermined ARI without an indication of the ARI through a PDCCH. For example, a resource indicated by a value of ARI=0 may be fixed in advance to be used as a resource for CSI. The resource for ACK/NACK may be limited to a resource indicated by a value of ARI=1, 2, 3 to distinguish it from the resource for CSI.

In a UL subframe scheduled to transmit CSI and ACK/NACK simultaneously, only the CSI is transmitted using a resource for CSI. In an ACK/NACK resource, the ACK/NACK and the CSI may be transmitted together.

Alternatively, the resource for CSI may have a form in which an ACK/NACK combination for a certain specific target is included, and the ACK/NACK resource may have a form in which an ACK/NACK combination 2 and the CSI are transmitted simultaneously.

Meanwhile, in the conventional ARI transmission, in case of FDD, transmission is performed by using a TPC field of a PDCCH for scheduling a PDSCH of a secondary cell. A TPC field of a PDCCH for scheduling a PDSCH of a primary cell is used for a power control usage which is an original usage. In case of TDD, transmission is performed by using a TPC field of the remaining PDCCHs other than a PDCCH (a TPC field of this PDCCH is used for a power control usage which is an original usage) for scheduling a PDSCH of a primary cell while having a DAI initial value (e.g., 1). If the CSI and the ACK/NACK are transmitted through multiplexing, a format and resource reserved for RRC may be used for CSI transmission. In this case, an indication of an ARI for designating an ACK/NACK transmission resource is unnecessary. Therefore, a bit used for the ARI may be used as follows.

1) TPC as Original Usage

All TPC values are signaled with the same value. In a case where a corresponding TPC value is used as a final power value or in case of FDD, an independent TPC value per CC may be signaled and an accumulation sum may be used as the final power value. Alternatively, in case of TDD, as to the same subframe, the same TPC value may be signaled for all CCs and a corresponding TPC value is independent for each subframe, and an accumulation sum of a corresponding TPC value for each subframe may be used as a final power value.

2) Used for Indicating UCI Combination

For example, a restriction of the maximum number of payload bits that can be transmitted or a limitation of a transmit power/code rate for a requested SINR may be considered to indicate a UCI combination as follows.

When there is periodic CSI for a plurality of DL CCs, a specific DL CC for which the periodic CSI is transmitted may be indicated. For example, all DL CCs, a predetermined DL CC or a specific DL CC may be directly indicated. On the other hand, a DL CC for dropping CSI may be indicated.

Alternatively, what will be transmitted by using the CSI may be indicated. For example, it may be indicated to transmit all of PMI, RI, and CQI, or a specific content (RI, PTI) having a priority may be indicated, or a specific content may be directly indicated. Alternatively, CSI to be dropped, not be transmitted, may be indicated. Information regarding whether CSI information is compressed (i.e., a predetermined simplified CSI information combination is used) may be indicated.

The indicated Information may be in regards to the maximum number of ACK/NACK payload bits that can be transmitted (or indirect information capable of measuring this, e.g., an ordinal value or the number of CCs scheduled in a downlink time duration corresponding to an uplink subframe, an ordinal value or the number of subframes), whether an ACK/NACK bit is compressed (whether spatial bundling is used, whether an additional subframe/CC region bundling, etc., is applied), etc.

A method of configuring a format in a designated resource may be indicated. For example, if a PUCCH format 3 is used, a capacity may be controlled by controlling a spreading factor value. Alternatively, information regarding the total number of bits that can be transmitted may be indicated.

Alternatively, if a transmission resource only for CSI is configured to use an ACK/NACK resource corresponding to a specific ARI value, the ARI may indicate the specific ARI value as a virtual CRC usage.

V. Coding Scheme

In case of using a PUCCH format 3, a selection criterion of single RM and double RM is required. For this, the single RM may be used when the number of bits of UCI is less than or equal to 11 bits, and the double RM may be used when the number of bits of UCI is greater than 11 bits. Of course, this is for exemplary purposes only.

1. Method of Determining Based on the Total Number of Bits of UCI Combination Actually Transmitted by UE.

ACK/NACK is transmitted based on the number of ACK/NACK bits, and CSI is transmitted based on the total number of CSI bits. When the ACK/NACK and the CSI are transmitted simultaneously, transmission is performed based on the number of ACK/NACK bits and the number of CSI bits.

When the ACK/NACK and the SR are transmitted simultaneously, transmission is performed based on the total sum of the number of ACK/NACK bits and the number of SR bits. When the SR and the CSI are transmitted simultaneously, transmission is performed based on the total sum of the number of SR bits and the number of CSI bits. When the ACK/NACK, the SR, and the CSI are transmitted simultaneously, transmission is performed based on the total sum of the number of ACK/NACK bits, the number of SR bits, and the number of CSI bits.

2. Method Based on the Total Sum of Transmissible UCI Combination Having Ambiguity and UCI Combination Having No Ambiguity.

Even in a case where a UE must transmit ACK/NACK in practice but misses it, the same coding scheme is maintained irrespective of whether an error occurs, so that a field configuration has no error when a BS decodes UCI and additional blinding decoding is not caused.

ACK/NACK transmission is performed based on the number of ACK/NACK bits, and CSI transmission is performed based on the total sum of the number of CSI bits and the number of transmissible ACK/NACK bits. Preferably, NACK is transmitted in a bit position for ACK/NACK.

The ACK/NACK and the CSI are transmitted simultaneously based on the number of ACK/NACK bits and the number of CSI bits. The ACK/NACK and the SR are transmitted simultaneously based on the total sum of the number of ACK/NACK bits and the number of SR bits. The SR and the CSI are transmitted simultaneously based on the total sum of the number of SR bits, the number of CSI bits, and the number of transmissible ACK/NACK bits. Preferably, NACK is transmitted in a bit position for ACK/NACK.

The ACK/NACK, the SR, and the CSI are transmitted simultaneously based on the total sum of the number of ACK/NACK bits, the number of SR bits, and the number of CSI bits.

3. Method Based on the Total Sum of Transmissible UCI Combination Having Ambiguity and UCI Combination Having No Ambiguity.

This is a method based on the total sum of all combinations, that is, the number of ACK/NACK bits, the number of SR bits, and the number of CSI bits.

The number of transmissible ACK/NACK bits is determined by the number of ACK/NACK bits that can be generated in a corresponding subframe. It is determined by the number of DL CCs assigned to a UE and a downlink transmission mode in each DL CC (according thereto, the maximum number of transmission blocks that can be scheduled in one downlink subframe is determined). In case of TDD, the number of DL subframes corresponding to one UL subframe must also be taken into account.

If a DL channel combination which is an ACK/NACK target is distinguished such as the ACK/NACK combination 1 and the ACK/NACK combination 2 and the number of ACK/NACK bits is determined according thereto, the number of transmissible ACK/NACK bits may be the number of bits based on the ACK/NACK combination 1 and the ACK/NACK combination 2.

VI. Individual Coding of ACK/NACK, SR, and CSI

An individual coding method is proposed when ACK/NACK (an SR bit may be added to ACK/NACK in a subframe in which SR is transmitted, hereinafter the same shall apply) and CSI are multiplexed.

Figure 23:
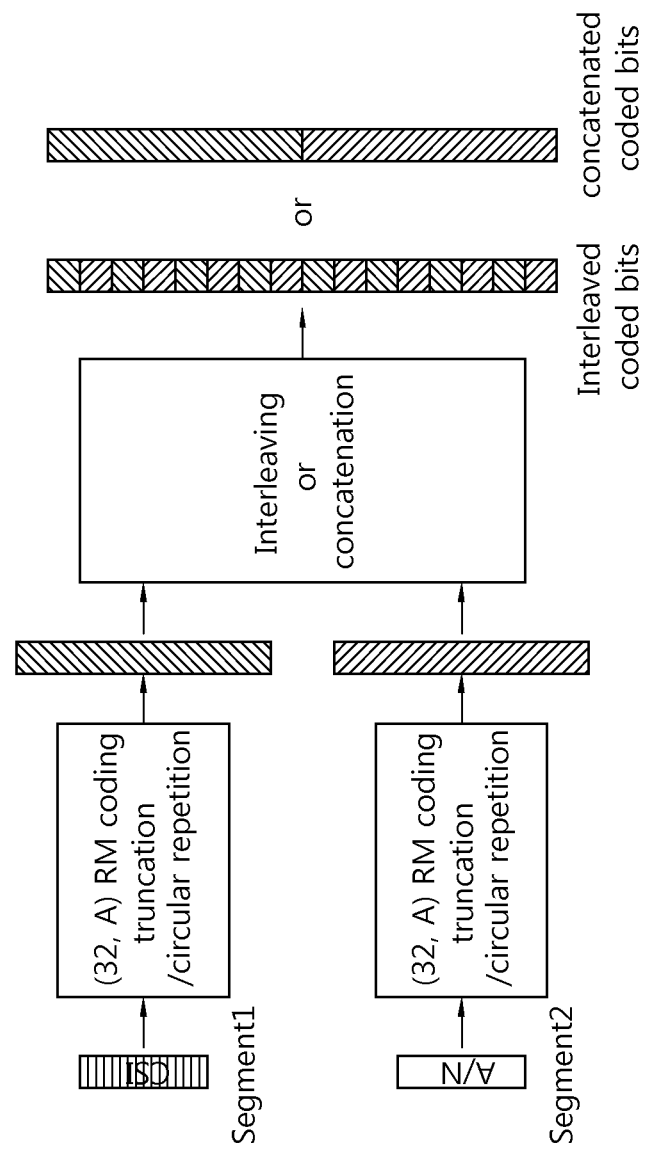
FIG. 23 is an example of individual coding of ACK/NACK and CSI.

FIG. 23 is an example of individual coding of ACK/NACK and CSI.

Referring to FIG. 23, mapping is performed to an RM coding block for each UCI type. Given that an error may occur in a presence/absence of ACK/NACK, it may be considered that CSI is mapped in a fixed manner only to a segment in a CSI transmission subframe irrespective of the presence/absence of ACK/NACK. The remaining segments are used for ACK/NACK transmission.

In a UL subframe in which a UE does not transmit CSI, ACK/NACK may be transmitted using all resources in a PUCCH format 3 assigned to the UE. On the other hand, even if the UE does not have ACK/NACK to be transmitted in the UL subframe, the CSI is mapped to the remaining resource other than a resource to which maximum ACK/NACK information that can be generated in a corresponding configuration is mapped.

Independent coding is applied to the ACK/NACK and the CSI, and may be RM-coded by mapping to each part of double RM coding. Rate matching may be applied differently according to a performance requirement for each of the ACK/NACK and the CSI.

That is, although an output of a double RM encoder is always rate-matched with 24 bits in the conventional PUCCH format 3, according to the number of CSI and ACK/NACK bits mapped to each RM and the capability requirement, a coded output of each RM is rate-matched with more than 24 bits (i.e., more than 12 QPSK modulation symbols) or less than 24 bits (i.e., less than 12 QPSK modulation symbols), and a sum of the number of coded bits of two RM coding outputs is 48 (i.e., 24 QPSK modulation symbols). In general, a capability requirement of ACK/NACK is less than BER $10^{-3}$, and a capability requirement of CSI is less than BLER $10^{-2}$.

Meanwhile, UCI may be grouped according to a priority of information and a requirement for an error rate. Information in a group may be joint-coded, and separate coding may be performed between groups.

As an example of grouping, ACK/NACK and SR may be determined to a $1^{st}$ group, and CSI may be determined to a $2^{nd}$ group. Alternatively, among a plurality of pieces of information of CSI, information (e.g., RI, PTI, W1, etc.) having an effect on information to be delivered in next transmission is included in the $1^{st}$ group which is the same group as the ACK/NACK, by giving a priority similar to that of the ACK/NACK, and the other information (e.g., CQI, PMI, etc.) may be included in the $2^{nd}$ group. When only the $1^{st}$ group (or $2^{nd}$ group) is transmitted, the $1^{st}$ group is joint-coded with single RM or double RM. When the $1^{st}$ group and the $2^{nd}$ group are transmitted simultaneously, the $1^{st}$ group and the $2^{nd}$ group may be individually coded to $1^{st}$ RM coding of double RM and $2^{nd}$ RM coding of double RM, respectively. According to an information amount, a coding scheme other than RM may be applied to UCI.

Figure 24:
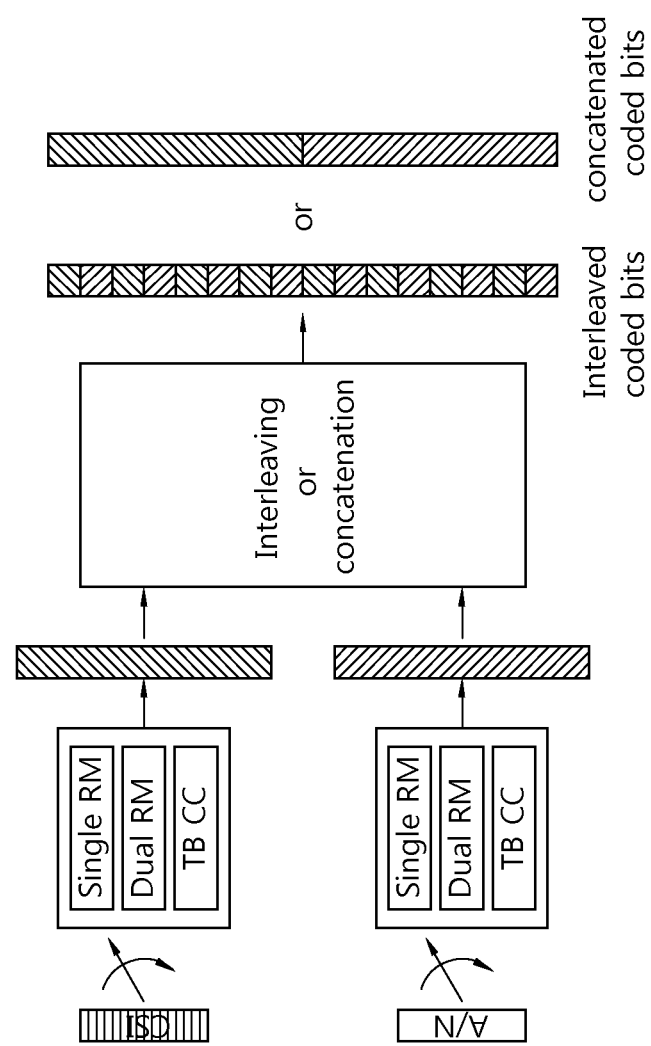
FIG. 24 is an example of a coding scheme of UCI.

FIG. 24 is an example of a coding scheme of UCI.

Referring to FIG. 24, UCI may be selectively coded to any one of single RM, double RM, and tail biting convolution coding (TB CC) according to a bit amount. For example, in case of ACK/NACK, single RM is used up to 10 bits (if an SR is included, 11 bits). Regarding CSI, CSI for a plurality of DL CCs may be applied, thereby applying double RM (regarding the CSI for the plurality of DL CCs, independent coding may be applied for each DL CC). Rate matching may vary for a coded bit in which CSI and ACK/NACK information is channel-coded according to an error rate requested per information. When repetition coding, simplex coding, etc., are selected as a coding scheme, the repetition coding may be applied to one bit, and the simplex coding may be applied to 2-bit ACK/NACK.

To prevent the coding scheme from changing depending on a UCI information amount, a method of limiting an input bit of each RM to be less than 11 bits may be considered. That is, the input bit is limited not to exceed 11 bits for each of the $1^{st}$ group and the $2^{nd}$ group. For this, UCI of each group can perform bundling if ACK/NACK exceeds 10 bits (if an SR is included, 11 bits). CSI may be dropped when exceeding 11 bits. If ACK/NACK, SR, RI, PTI, and W1 are grouped, they are grouped into one group only when the total sum is less than or equal to 11 bits. If ACK/NACK and SR are grouped and a sum of other information to be transmitted simultaneously exceeds 11 bits, only ACK/NACK and SR may be transmitted as the $1^{st}$ group, and the other information may be transmitted by being grouped into the $2^{nd}$ group.

VII. Content Indicator Transmission

As described above, ambiguity may occur for a presence/absence of ACK/NACK. One method of solving this is to reserve (prepare) a specific bit field irrespective of the presence/absence of ACK/NACK. However, such a method has a disadvantage in that a resource efficiency deteriorates.

In the present invention, if UCI is transmitted in combination, an indicator for announcing a transmission UCI content combination may be included in a field in a specific fixed location.

Figure 25:
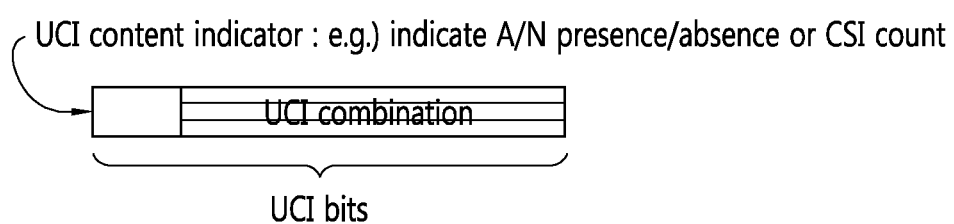
FIG. 25 shows an example of including a UCI content indicator.

FIG. 25 shows an example of including a UCI content indicator.

As shown in FIG. 25, one bit among UCI bits may indicate whether to include a specific UCI type, e.g., ACK/NACK. For example, the UCI content indicator may indicate whether an 'ACK/NACK combination 1' is included in a $1^{st}$ resource by referring to FIG. 22.

Alternatively, a UCI combination may be reported with a plurality of bits. In this case, it may be reported by including the number of CSI transmission target DL CCs, the number of ACK/NACK bits, whether to select CSI or ACK/NACK, etc.

The UCI content indicator may be individually coded by distinguishing it from other UCIs to improve a decoding performance. Additional channel coding may be performed when combining with other UCIs. That is, $1^{st}$ channel coding may be performed first on the UCI content indicator, and thereafter $2^{nd}$ channel coding may be performed together with other UCIs. For example, repetition coding may be performed on a 1-bit UCI content indicator, and simplex coding may be performed on a 2-bit UCI content indicator, and thereafter joint coding may be performed together with other UCIs.

A UCI combination may be regulated according to the number of available bits of a UL control channel on the basis of whether ACK/NACK transmission is performed. That is, only ACK/NACK may be transmitted by utilizing all resources while dropping CSI in a UL subframe in which the CSI is transmitted, or compressed ACK/NACK and CSI for one DL CC may be transmitted, or CSI transmission for a plurality of DL CCs without ACK/NACK transmission may be indicated.

A method of using a UCI content indicator and a method described with reference to FIG. 22 may be selectively used.

For example, a PUCCH format 3 may be assigned through RRC for the purpose of transmitting UCI consisting of only CSI to a UE.

In this case, i) some of resources for transmitting the PUCCH format 3 are reserved for ACK/NACK (i.e., an ACK/NACK combination 1). This is to prepare for a case where the UE misses a data unit which requests ACK/NACK, i.e., a combination of an ACK/NACK target. A resource prepared for ACK/NACK may be: 1) 1 or 2 bits according to the number of codewords; 2) in case of TDD, may be added with a 1-bit ACK/NACK bit for SPS PDSCH other than bits of the case 1); and 3) an SR bit may also be included in an SR subframe. This is a method described with reference to FIG. 22.

Alternatively, in the above case, ii) the UE may use a UCI content indicator to report whether the ACK/NACK combination 1 is included.

That is, the above method i) is a method in which some resources of the PUCCH format 3 for UCI configured only with CSI are reserved for ACK/NACK, and the method ii) is a method of reporting a combination of UCI by transmitting a UCI content indicator to some resources of the PUCCH format 3 for UCI configured only with CSI.

VIII. Selection of Transmission Resource Based on UCI Combination when Simultaneous Transmission of ACK/NACK and CSI is Configured.

When it is configured to simultaneously transmit multiple ACK/NACK and CSI through multiplexing, a UE may select a transmission resource according to a UCI combination to be transmitted.

In ACK/NACK transmission, PUCCH formats 1a/1b are used when there is one SPS PDSCH transmitted through a PCC, or when there is one PDSCH transmitted through a PCC scheduled with a PDCCH, or when there is one PDCCH (e.g., SPS release PDCCH) requesting an ACK/NACK response. Channel selection of PUCCH formats 1a/1b is used when one SPS PDSCH transmitted through a PCC coexists with a PDSCH transmitted through a PCC scheduled with a PDCCH or a PDCCH (SPS release PDCCH) requesting an ACK/NACK response. In other cases, the PUCCH format 3 is used. ACK/NACK may be transmitted up to 20 bits.

In CSI transmission, when only CSI for one CC is transmitted without ACK/NACK, the CSI is transmitted with the PUCCH format 2. When a plurality of CSIs must be transmitted, the PUCCH format 3 is used.

In a case where ACK/NACK and CSI are transmitted simultaneously, when there is one SPS PDSCH transmitted through a PCC, or when there is one PDSCH transmitted through a PCC scheduled with a PDCCH, or in a case where there is one PDCCH requesting an ACK/NACK response and only CSI for one CC is transmitted, the CSI is transmitted with the PUCCH format 2. ACK/NACK is transmitted through reference signal modulation of the PUCCH format 2. In other cases, transmission is performed by multiplexing with the PUCCH format 3. For CSI multiplexing, ACK/NACK may be compressed by using bundling, a counter, etc.

When there is one SPS PDSCH transmitted through a PCC in a subframe in which CSI for a plurality of DL CCs collides, or when there is one PDSCH transmitted through a PCC scheduled with a PDCCH, or in a case where there is one PDCCH requesting an ACK/NACK response, only CSI for one DL CC may be selected for a fallback operation while dropping the remaining CSIs. The selected CSI may be transmitted with the PUCCH format 2, and the ACK/NACK may be transmitted through reference signal modulation of the PUCCH format 2.

In simultaneous transmission of the ACK/NACK and the SR, when there is one SPS PDSCH transmitted through a PCC or when there is one PDSCH transmitted through a PCC scheduled with a PDCCH, or in a case where there is one PDCCH requesting an ACK/NACK response, a negative SR may be transmitted through a dynamic format 1a/1b resource (i.e., a resource corresponding to a $1^{st}$ CCE in which a PDCCH is transmitted) or through a PUCCH format 1a/1b resource designated to SPS. A positive ACK/NACK may be transmitted by using a PUCCH format 1a/1b resource designated to SR. In other cases, transmission may be performed by multiplexing with the PUCCH format 3.

When SR and CSI are transmitted simultaneously, transmission may be performed by multiplexing with the PUCCH format 3. When ACK/NACK, SR, and CSR are transmitted simultaneously, transmission may be performed by multiplexing with the PUCCH format 3.

As described above, an LTE-A system may use a PUCCH format 3 to transmit multiple ACK/NACK. In this case, a transmissible information amount may be limited according to a limitation of a channel coding codebook size (e.g., in case of the PUCCH format 3, up to 20 bits or 22 bits), a limitation of the number of ACK/NACK information bits depending on the number of UCI (SR and/or CSI) bits other than ACK/NACK transmitted through a physical channel, or an uplink channel state. Assume that the former is Y bit (e.g., 20 or 22 bits) and the latter is X bit. Herein, according to the uplink channel state, the X bit may be configured by RRC or may be signaled through a PDCCH.

Since ACK/NACK can be transmitted independently one-by-one per codeword, if the number of codewords in a DL subframe corresponding to one UL subframe exceeds X, codewords may be grouped and ACK/NACK may be transmitted through bundling with respect to a corresponding group. In this case, the following rules can be applied.

Method 1. A method in which, if the number of codewords exceeds X, spatial bundling is first applied, and time-domain bundling or CC-domain bundling is applied between neighboring subframes.

1) If the number of codewords exceeds X, the codewords in the same subframe performs bundling on ACK/NACK first. That is, spatial bundling is performed.

2) If the number of ACK/NACK bits exceeds X even after spatial bundling, time-domain bundling is additionally applied. The time-domain bundling is performed until the number of ACK/NACK bits becomes less than or equal to X bits according to a predetermined rule. For example, the predetermined rule may be grouping from a first or last subframe.

3) If the number of ACK/NACK bits exceeds X bits even after the time-domain bundling, neighboring subframe groups are additionally subjected to time-domain bundling. The time-domain bundling is performed until the number of ACK/NACK bits becomes the X bit according to a predetermined rule. For example, the predetermined rule may be grouping from a first or last subframe.

Method 2. Method in which, if the number of codewords exceeds X, spatial bundling is first applied, and bundling based on a bundling mask is applied.

1) If the number of codewords exceeds X, spatial bundling is first applied.

2) If the number of ACK/NACK bits exceeds X even after spatial bundling, bundling based on a bundling mask signaled with RRC is performed. The bundling mask is information indicating a bundling group. The bundling group may be defined in a CC domain or a time domain.

Method 3. Method in which bundling is configured such that the number of codewords does not exceeds X.

Instead of signaling a value X due to a limitation of the value X, whether to apply bundling may be directly configured. In this case, a bundling unit may be any one of the followings.

Whether to apply spatial bundling may be configured commonly to all subframes with respect to all CCs, or whether to apply spatial bundling may be configured in one subframe unit in one CC, whether to apply spatial bundling may be configured commonly to all subframes in the same CC, whether to apply spatial bundling may be configured commonly to all CCs of the same subframe, or whether to apply spatial bundling may be configured commonly to all subframes having the same DL DAI value.

X may vary depending on M, i.e., the number of DL subframes corresponding to one UL subframe. For example, in TDD, M=2 and M=1 coexist in a DL-UL configuration #1. M=3 and M=2 coexist in a DL-UL configuration #3 (the DL-UL configuration #1 and 3 may refer to 3GPP TS 36.211 V10.2.0 (2011-06) table 4.2-2). In this case, the number of codewords for transmitting ACK/NACK may vary depending on the value M. Therefore, whether to apply spatial bundling may be configured differently according to the value M. For example, if M=3, when a CC to which spatial bundling is applied is M=2, spatial bundling may not be applied.

Alternatively, if M=2, a spatial bundling configuration may be applied, and if M=1, the spatial bundling configuration is not always applied and ACK/NACK may be transmitted individually. Apparently, in an ACK/NACK transmission format, a bundling configuration greater than or equal to Y bits that cannot be supported physically is excluded.

A UE may aggregate and use CCs configured with different TDD DL-UL configurations. In this case, according to a UL subframe in which ACK/NACK is transmitted, the number of DL subframes corresponding to the UL subframe may vary for each CC. Therefore, the number of codewords which must feed back ACK/NACK may change. Therefore, in this case, a spatial bundling configuration may differ for each UL subframe (of a primary cell). Alternatively, the spatial bundling configuration may differ for each number of all codewords of a DL subframe of a primary cell and a DL subframe of a secondary cell corresponding to a UL subframe. In addition, according to whether it is a CSI subframe configured to transmit CSI or according to the number of CSI bits, the spatial bundling configuration may differ.

In addition, as to a configuration for each UL subframe, a pattern of one frame unit may be configured by considering a repetition period of a change in the number of codewords (e.g., it is generated by HARQ timing in TDD which uses a different DL-UL configuration for each cell), a CSI transmission period, etc., or a pattern of a plurality of frame units may be configured.

In another method, in TDD which uses a different DL-UL configuration for each cell, it may be considered to perform spatial bundling always for all CCs to simplify an A/N feedback configuration.

In another method, when multiple ACK/NACK and CSI are configured to be transmitted simultaneously, it may be configured such that spatial bundling is always applied.

In another method, if multiple ACK/NACK spatial bundling is applied to a UE due to a shortage of SINR, it may also be considered that the UE is not allowed to simultaneously transmit multiple ACK/NACK and CSI by using a PUCCH through multiplexing. In this case, ACK/NACK may be limited to an ACK/NACK combination in the presence of an ARI. That is, in case of an ACK/NACK combination in the presence of the ARI, simultaneous transmission of ACK/NACK and CSI is not allowed, and in case of an ACK/NACK combination in the absence of the ARI, simultaneous transmission with CSI is allowed.

Additional bundling may be applied other than the spatial bundling. The additional bundling also applies differently according to a value M and the number of respective codewords corresponding to one UL subframe.

A per-CC spatial bundling configuration may equally apply also to a case where ACK/NACK is piggybacked through a PUSCH. That is, the ACK/NACK which is piggybacked through the PUSCH has a UL grant for scheduling the PUSCH, and according to a UL DAI transmitted thereon, an ACK/NACK payload size may vary adaptively depending on a DL PDSCH actually scheduled. The per-CC spatial bundling configuration may be directly applied to simplify an operation of a UE.

To allow ACK/NACK spatial bundling to be flexible, whether to perform ACK/NACK spatial bundling when transmitted through a PUSCH may be configured additionally from whether to perform ACK/NACK spatial bundling when transmitted through a PUCCH. Whether to perform spatial bundling may be configured differently according to a value M and a value UL DAI (or a combination of M and UL DAD.

As shown in the aforementioned methods 1 and 2, if spatial bundling is selectively applied according to a maximum transmissible ACK/NACK information amount X, it may be applied simultaneously in a time domain with all CCs when applying the spatial bundling, or bundling may be applied sequentially according to X. That is, spatial bundling may be applied sequentially in a unit of one PDSCH so that the ACK/NACK information amount is X, or spatial bundling may be applied sequentially in a unit of the same CC or the same subframe or the same DL DAI so that the ACK/NACK information amount is less than or equal to X. Such a method is not limited to the aforementioned methods 1 and 2.

An order of performing spatial bundling may be a predetermined order, i.e., CC order/subframe order/DAI order. That is, bundling may be performed on one CC and thereafter bundling of a next CC may be performed.

In this case, since there is a higher possibility that scheduling of a PDSCH occurs frequently through a specific CC, e.g., a PCC, than a case where all CCs are simultaneously scheduled, it is more advantageous in terms of data transmission efficiency to maintain individual ACK/NACK of codewords transmitted through the CC. Therefore, spatial bundling is applied to the PCC at the end.

If an index value of the PCC is 0, to apply spatial bundling at the end, the spatial bundling may be applied gradually from a CC having the greatest index.

Alternatively, since a DAI value is scheduled in an ascending order, the spatial bundling may be applied gradually from a subframe having a great DAI so that the spatial bundling is performed on a subframe having the smallest DAI value at the end.

Alternatively, if spatial bundling is required, the spatial bundling may be first applied to the entire SCC, and only when exceeding X bits, the spatial bundling may be applied to a PCC.

In the present invention, spatial bundling implies bundling performed on ACK/NACK for a plurality of codewords received in one DL subframe in one CC. For example, each ACK/NACK (i.e., 1 if ACK, and 0 if NACK, or vice versa) for two codewords are subjected to a logical AND operation to derive one piece of ACK/NACK information.

Bundling between CCs implies bundling of ACK/NACK for a plurality of codewords received from the same subframes of different CCs assigned to a UE. For example, assume that a DL CC 0 and a DL CC 1 are assigned to the UE. A BS may transmit two codewords in a DL subframe N of the DL CC 0, and may transmit one codeword in a DL subframe N of the DL CC 1. In this case, the UE may perform bundling on 3-bit ACK/NACK information for the three codewords to generate 1-bit ACK/NACK information. That is, only when all of the three codewords are successfully received, ACK is generated, and otherwise, NACK is generated.

The bundling between CCs may be applied to all DL subframes, and may be applied only some DL subframes according to a determined rule.

Bundling in a time domain implies bundling performed by the UE on ACK/NACK for a data unit (PDSCH, or codeword) received in different DL subframes. For example, assume that a DL CC 0 and a DL CC 1 are assigned to the UE, the DL CC 0 is a MIMO mode capable of receiving two codewords, and the DL CC 1 is a single-codeword transmission mode capable of receiving one codeword. In this case, if the UE successfully receives a codeword 0 and a codeword 1 in a DL subframe 1 of the DL CC 0, and successfully receives only a codeword 0 in a DL subframe 2 of the DL CC 1, the UE generates ACK as to the codeword 0, and generates NACK as to the codeword 1. That is, ACK/NACK bundling is performed for each codeword received in different DL subframes. In addition, it is also possible to count the number of consecutive ACK bits for each codeword received in different subframes. Herein, a subframe order may be determined according to a subframe index or a DAI.

Figure 26:
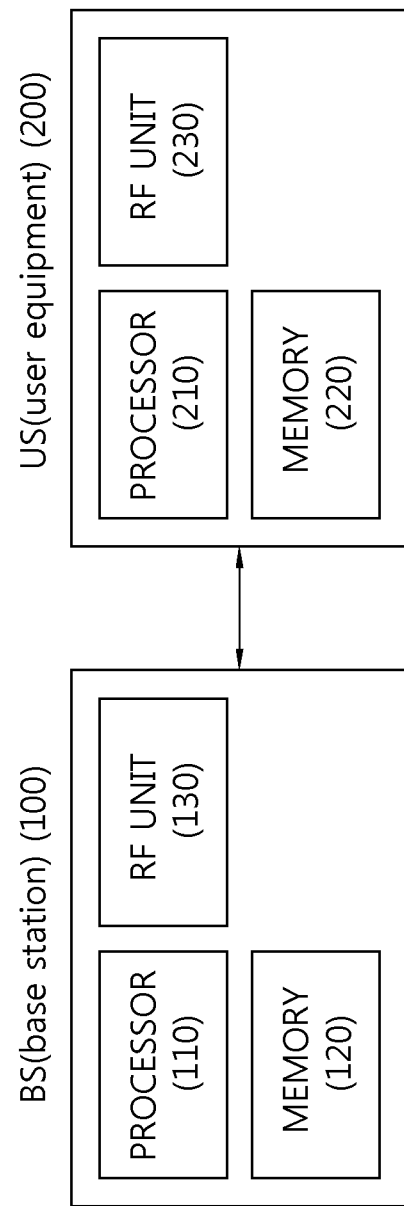
FIG. 26 is a block diagram of a base station and a user equipment according to an embodiment of the present invention.

FIG. 26 is a block diagram of a BS and a UE according to an embodiment of the present invention.

A BS 100 includes a processor 110, a memory 120, and a radio frequency (RF) unit 130. The processor 110 implements the proposed functions, procedures, and/or methods. Layers of a radio interface protocol can be implemented by the processor 110. The processor 110 can configure periodic CSI transmission and SR transmission through a higher layer signal such as an RRC message. For example, the processor 110 can announce a subframe in which periodic CSI, SR, etc., can be transmitted. In addition, the processor 110 can configure a UE to use a PUCCH format to be used in ACK/NACK feedback, for example, a PUCCH format 3. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. Layers of a radio interface protocol can be implemented by the processor 210. The processor 210 generates a bit stream concatenated in order of $1^{st}$ UCI and $2^{nd}$ UCI. The $1^{st}$ UCI includes ACK/NACK, and the $2^{nd}$ UCI may be periodic channel state information (CSI). The concatenated bit stream is a format in which bits indicating the $2^{nd}$ UCI is appended at the end of bits indicating the $1^{st}$ UCI. The concatenated bit stream is interleaved when the number of bits of the concatenated bit stream has a specific range (greater than 11 and less than or equal to 22). By the interleaving, the concatenated bit stream is aligned in order of a $1^{st}$ segment and a $2^{nd}$ segment. The $1^{st}$ segment includes bits having an even-numbered bit index of the concatenated bit stream, and the $2^{nd}$ segment includes bits having an odd-numbered bit index of the concatenated bit stream. The $1^{st}$ segment and the $2^{nd}$ segment are transmitted after being interleaved through RM channel coding, that is, in such a manner that two bits are alternated after double RM coding (see FIG. 16). The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method for performing channel-coding related to uplink control information (UCI), performed by a user equipment (UE) in a wireless communication system, the method comprising:

generating a $1^{st}$ segment of bits and a $2^{nd}$ segment of bits; and performing channel-coding on each of the $1^{st}$ segment of bits and the $2^{nd}$ segment of bits using block code given in a table below, wherein the block code includes 11 basis sequences ($M_{i,n}$) where i is an integer 0≤i≤31 and each of the 11 basis sequences has an index n, where n is an integer and 0≤n≤10, and wherein, when each of the $1^{st}$ segment of bits and the $2^{nd}$ segment of bits includes an ACK/NACK information bit and a periodic channel state information (CSI) bit, the ACK/NACK information bit is encoded based on, among the 11 basis sequences, a basis sequence having an index lower than an index of a basis sequence used for encoding the periodic CSI bit,

| i | $M_{i,0}$ | $M_{i,1}$ | $M_{i,2}$ | $M_{i,3}$ | $M_{i,4}$ | $M_{i,5}$ |
|---|---|---|---|---|---|---|
| 0 | 1 | 1 | 0 | 0 | 0 | 0 |
| 1 | 1 | 1 | 1 | 0 | 0 | 0 |
| 2 | 1 | 0 | 0 | 1 | 0 | 0 |
| 3 | 1 | 0 | 1 | 1 | 0 | 0 |
| 4 | 1 | 1 | 1 | 1 | 0 | 0 |
| 5 | 1 | 1 | 0 | 0 | 1 | 0 |
| 6 | 1 | 0 | 1 | 0 | 1 | 0 |
| 7 | 1 | 0 | 0 | 1 | 1 | 0 |
| 8 | 1 | 1 | 0 | 1 | 1 | 0 |
| 9 | 1 | 0 | 1 | 1 | 1 | 0 |
| 10 | 1 | 0 | 1 | 0 | 0 | 1 |
| 11 | 1 | 1 | 1 | 0 | 0 | 1 |
| 12 | 1 | 0 | 0 | 1 | 0 | 1 |
| 13 | 1 | 1 | 0 | 1 | 0 | 1 |
| 14 | 1 | 0 | 0 | 0 | 1 | 1 |
| 15 | 1 | 1 | 0 | 0 | 1 | 1 |
| 16 | 1 | 1 | 1 | 0 | 1 | 1 |
| 17 | 1 | 0 | 0 | 1 | 1 | 1 |
| 18 | 1 | 1 | 0 | 1 | 1 | 1 |
| 19 | 1 | 0 | 0 | 0 | 0 | 1 |
| 20 | 1 | 0 | 1 | 0 | 0 | 0 |
| 21 | 1 | 1 | 0 | 1 | 0 | 0 |
| 22 | 1 | 0 | 0 | 0 | 1 | 0 |
| 23 | 1 | 1 | 1 | 0 | 1 | 0 |
| 24 | 1 | 1 | 1 | 1 | 1 | 0 |
| 25 | 1 | 1 | 0 | 0 | 0 | 1 |
| 26 | 1 | 0 | 1 | 1 | 0 | 1 |
| 27 | 1 | 1 | 1 | 1 | 0 | 1 |
| 28 | 1 | 0 | 1 | 0 | 1 | 1 |
| 29 | 1 | 0 | 1 | 1 | 1 | 1 |
| 30 | 1 | 1 | 1 | 1 | 1 | 1 |
| 31 | 1 | 0 | 0 | 0 | 0 | 0 |

| i | $M_{i,6}$ | $M_{i,7}$ | $M_{i,8}$ | $M_{i,9}$ | $M_{i,10}$ |
|---|---|---|---|---|---|
| 0 | 0 | 0 | 0 | 0 | 1 |
| 1 | 0 | 0 | 0 | 1 | 1 |
| 2 | 1 | 0 | 1 | 1 | 1 |
| 3 | 0 | 0 | 1 | 0 | 1 |
| 4 | 0 | 1 | 0 | 0 | 1 |
| 5 | 1 | 1 | 1 | 0 | 1 |
| 6 | 1 | 0 | 1 | 1 | 1 |
| 7 | 0 | 1 | 1 | 0 | 1 |
| 8 | 0 | 1 | 0 | 1 | 1 |
| 9 | 1 | 0 | 0 | 1 | 1 |
| 10 | 1 | 1 | 0 | 1 | 1 |
| 11 | 1 | 0 | 1 | 0 | 1 |
| 12 | 0 | 1 | 1 | 1 | 1 |
| 13 | 0 | 1 | 0 | 1 | 1 |
| 14 | 0 | 1 | 0 | 0 | 1 |
| 15 | 1 | 1 | 0 | 1 | 1 |
| 16 | 1 | 0 | 0 | 1 | 0 |
| 17 | 0 | 0 | 1 | 0 | 0 |
| 18 | 1 | 1 | 0 | 0 | 0 |
| 19 | 1 | 0 | 0 | 0 | 0 |
| 20 | 1 | 0 | 0 | 0 | 1 |
| 21 | 0 | 0 | 0 | 1 | 1 |
| 22 | 0 | 1 | 1 | 0 | 1 |
| 23 | 0 | 0 | 1 | 1 | 1 |
| 24 | 1 | 1 | 1 | 1 | 0 |
| 25 | 1 | 1 | 0 | 0 | 1 |
| 26 | 0 | 0 | 1 | 1 | 0 |
| 27 | 0 | 1 | 1 | 1 | 0 |
| 28 | 1 | 0 | 1 | 1 | 1 |
| 29 | 1 | 1 | 1 | 0 | 0 |
| 30 | 1 | 1 | 1 | 1 | 1 |
| 31 | 0 | 0 | 0 | 0 | 0. |

2. The method of claim 1, wherein the ACK/NACK information bit is located before the periodic CSI bit on the basis of a most important bit, MSB, in each of the $1^{st}$ segment of bits and the $2^{nd}$ segment of bits.

3. The method of claim 1, further comprises:
generating a bit stream comprising $1^{st}$ UCI and $2^{nd}$ UCI, wherein the Pt UCI includes acknowledgement/not-acknowledgement (ACK/NACK) information and the $2^{nd}$ UCI is periodic channel state information (CSI), and wherein the $2^{nd}$ UCI bits are appended to the end of the $1^{st}$ UCI bits; and
if the number of bits of the bit stream is greater than 11 bits and less than or equal to 22 bits, segmenting the bit stream to obtain the $1^{st}$ segment of bits and the $2^{nd}$ segment of bits, wherein the $1^{st}$ segment includes the even numbered bits from the bit stream and the $2^{nd}$ segment includes the odd numbered bits from the bit stream.

4. The method of claim 1, further comprises:
transmitting the $1^{st}$ segment of bits and the $2^{nd}$ segment of bits, to a base station, after the channel-coding.

5. The method of claim 4, wherein the $1^{st}$ segment of bits and the $2^{nd}$ segment of bits are transmitted through a physical uplink control channel (PUCCH).

6. A user equipment (UE) for performing channel-coding related to uplink control information (UCI), the user equipment comprising:
a radio frequency (RF) unit for transmitting or receiving a radio signal; and
a processor operatively coupled to the RF unit, wherein the processor is configured to:
generate a $1^{st}$ segment of bits and $2^{nd}$ segment of bits; and
perform channel-coding on each of the $1^{st}$ segment of bits and the $2^{nd}$ segment of bits using block code given in a table below,
wherein the block code includes 11 basis sequences ($M_{i,n}$) where i is an integer $0 \le i \le 31$ and each of the 11 basis sequences has an index n, where n is an integer and $0 \le n \le 10$, and
wherein when each of the $1^{st}$ segment of bits and the $2^{nd}$ segment of bits includes an ACK/NACK information bit and a periodic channel state information (CSI) bit, the ACK/NACK information bit is encoded based on, among the 11 basis sequences, a basis sequence having an index lower than an index of a basis sequence used for encoding the periodic CSI bit,

| i | $M_{i,0}$ | $M_{i,1}$ | $M_{i,2}$ | $M_{i,3}$ | $M_{i,4}$ | $M_{i,5}$ |
|---|---|---|---|---|---|---|
| 0 | 1 | 1 | 0 | 0 | 0 | 0 |
| 1 | 1 | 1 | 1 | 0 | 0 | 0 |
| 2 | 1 | 0 | 0 | 1 | 0 | 0 |
| 3 | 1 | 0 | 1 | 1 | 0 | 0 |
| 4 | 1 | 1 | 1 | 1 | 0 | 0 |
| 5 | 1 | 1 | 0 | 0 | 1 | 0 |
| 6 | 1 | 0 | 1 | 0 | 1 | 0 |
| 7 | 1 | 0 | 0 | 1 | 1 | 0 |
| 8 | 1 | 1 | 0 | 1 | 1 | 0 |
| 9 | 1 | 0 | 1 | 1 | 1 | 0 |
| 10 | 1 | 0 | 1 | 0 | 0 | 1 |
| 11 | 1 | 1 | 1 | 0 | 0 | 1 |
| 12 | 1 | 0 | 0 | 1 | 0 | 1 |
| 13 | 1 | 1 | 0 | 1 | 0 | 1 |
| 14 | 1 | 0 | 0 | 0 | 1 | 1 |
| 15 | 1 | 1 | 0 | 0 | 1 | 1 |
| 16 | 1 | 1 | 1 | 0 | 1 | 1 |
| 17 | 1 | 0 | 0 | 1 | 1 | 1 |
| 18 | 1 | 1 | 0 | 1 | 1 | 1 |
| 19 | 1 | 0 | 0 | 0 | 0 | 1 |
| 20 | 1 | 0 | 1 | 0 | 0 | 0 |
| 21 | 1 | 1 | 0 | 1 | 0 | 0 |
| 22 | 1 | 0 | 0 | 0 | 1 | 0 |
| 23 | 1 | 1 | 1 | 0 | 1 | 0 |
| 24 | 1 | 1 | 1 | 1 | 1 | 0 |

-continued

| | | | | | | |
|---|---|---|---|---|---|---|
| 25 | 1 | 1 | 0 | 0 | 0 | 1 |
| 26 | 1 | 0 | 1 | 1 | 0 | 1 |
| 27 | 1 | 1 | 1 | 1 | 0 | 1 |
| 28 | 1 | 0 | 1 | 0 | 1 | 1 |
| 29 | 1 | 0 | 1 | 1 | 1 | 1 |
| 30 | 1 | 1 | 1 | 1 | 1 | 1 |
| 31 | 1 | 0 | 0 | 0 | 0 | 0 |

| i | $M_{i,6}$ | $M_{i,7}$ | $M_{i,8}$ | $M_{i,9}$ | $M_{i,10}$ |
|---|---|---|---|---|---|
| 0 | 0 | 0 | 0 | 0 | 1 |
| 1 | 0 | 0 | 0 | 1 | 1 |
| 2 | 1 | 0 | 1 | 1 | 1 |
| 3 | 0 | 0 | 1 | 0 | 1 |
| 4 | 0 | 1 | 0 | 0 | 1 |
| 5 | 1 | 1 | 1 | 0 | 1 |
| 6 | 1 | 0 | 1 | 1 | 1 |
| 7 | 0 | 1 | 1 | 0 | 1 |
| 8 | 0 | 1 | 0 | 1 | 1 |
| 9 | 1 | 0 | 0 | 1 | 1 |
| 10 | 1 | 1 | 0 | 1 | 1 |
| 11 | 1 | 0 | 1 | 0 | 1 |
| 12 | 0 | 1 | 1 | 1 | 1 |
| 13 | 0 | 1 | 0 | 1 | 1 |
| 14 | 0 | 1 | 0 | 0 | 1 |
| 15 | 1 | 1 | 0 | 1 | 1 |
| 16 | 1 | 0 | 0 | 1 | 0 |
| 17 | 0 | 0 | 1 | 0 | 0 |
| 18 | 1 | 1 | 0 | 0 | 0 |

-continued

| | | | | | |
|---|---|---|---|---|---|
| 19 | 1 | 0 | 0 | 0 | 0 |
| 20 | 1 | 0 | 0 | 0 | 1 |
| 21 | 0 | 0 | 0 | 1 | 1 |
| 22 | 0 | 1 | 1 | 0 | 1 |
| 23 | 0 | 0 | 1 | 1 | 1 |
| 24 | 1 | 1 | 1 | 1 | 0 |
| 25 | 1 | 1 | 0 | 0 | 1 |
| 26 | 0 | 0 | 1 | 1 | 0 |
| 27 | 0 | 1 | 1 | 1 | 0 |
| 28 | 1 | 0 | 1 | 0 | 0 |
| 29 | 1 | 1 | 1 | 0 | 0 |
| 30 | 1 | 1 | 1 | 1 | 1 |
| 31 | 0 | 0 | 0 | 0 | 0. |

7. The user equipment of claim 6, wherein the ACK/NACK information bit is located before the periodic CSI bit on the basis of a most important bit, MSB, in each of the $1^{st}$ segment of bits and the $2^{nd}$ segment of bits.

8. The user equipment of claim 6, the processor is further configured to:
   transmit the $1^{st}$ segment of bits and the $2^{nd}$ segment of bits, to a base station, after the channel-coding.

9. The user equipment of claim 8, wherein the $1^{st}$ segment of bits and the $2^{nd}$ segment of bits are transmitted through a physical uplink control channel (PUCCH).

* * * * *